US012651243B2

(12) United States Patent
 Hilal et al.

(10) Patent No.: US 12,651,243 B2
(45) Date of Patent: Jun. 9, 2026

(54) ISSUING A VIRTUAL VALUE-BEARING CARD ASSOCIATED WITH ONLY NON-PERSONALLY IDENTIFYING INFORMATION FROM A KIOSK

(71) Applicants: Ready Credit Corporation, Eden Prairie, MN (US); REVERSE ATM LLC, Miami, FL (US)

(72) Inventors: George Anthony Hilal, Maple Grove, MN (US); Brian J. Hedberg, Edina, MN (US); Thomas D. Smith, Portsmouth, RI (US)

(73) Assignees: Ready Credit Corporation, Eden Prairie, MN (US); Reverse ATM LLC, Miami, FL (US)

( * ) Notice: Subject to any disclaimer, the term of this patent is extended or adjusted under 35 U.S.C. 154(b) by 168 days.

(21) Appl. No.: 17/232,451

(22) Filed: Apr. 16, 2021

(65) Prior Publication Data

US 2021/0326840 A1 Oct. 21, 2021

Related U.S. Application Data

(60) Provisional application No. 63/065,715, filed on Aug. 14, 2020, provisional application No. 63/011,559, filed on Apr. 17, 2020.

(51) Int. Cl.
 *G06Q 20/18* (2012.01)
 *G06Q 20/34* (2012.01)

(52) U.S. Cl.
 CPC ........... *G06Q 20/351* (2013.01); *G06Q 20/18* (2013.01)

(58) Field of Classification Search
 CPC .............................. G06Q 20/351; G06Q 20/18
 (Continued)

(56) References Cited

U.S. PATENT DOCUMENTS 7,766,225 B2 8/2010 Walsh et al.
8,893,963 B2 11/2014 Walsh et al.
 (Continued)

FOREIGN PATENT DOCUMENTS

AU 2003211085 B2 6/2008
CA 2660418 C * 8/2018 .............. G07F 9/08
 (Continued)

OTHER PUBLICATIONS

Ritcha Ranjan, Tokenization of a physical debit or credit card for payment, Oct. 29, 2017, ip.com (Year: 2017).*

(Continued)

*Primary Examiner* — Ryan D Donlon
*Assistant Examiner* — Gregory M James
(74) *Attorney, Agent, or Firm* — Merchant & Gould P.C.

(57) ABSTRACT

A system and method for issuing a virtual value-bearing card associated with only non-personally identifying information is disclosed. A remote internet enabled device, an input device, a network coupling, and a card dispenser communicate to convert physical or electronic currency, wherein the converted funds are immediately available to the user with a virtual value bearing card stored on an application hosted on an internet enabled device. The converted funds are simultaneously available on a physical card. The input device is configured to receive input to scan a code graphically provided by the internet enabled device. The code includes only non-personally identifiable information. The network coupling is configured to send the new account request to an acquirer processor and to receive an approval response from the acquirer processor. A virtual card initiator is operationally coupled to the network coupling, the virtual card initiator being configured to link the account number and the value of the received assets together with a request to generate the virtual value-bearing card, activate the card, (Continued)

load funds onto the card and to add the card to a remote internet enabled device, such as a smart phone. The virtual card includes only non-personally identifiable information. The non-personally identifiable information includes the account number.

12 Claims, 23 Drawing Sheets

(58) Field of Classification Search
USPC .......................................................... 705/39
See application file for complete search history.

(56) References Cited

U.S. PATENT DOCUMENTS

| | | | |
|---|---|---|---|
| 2003/0212796 A1 | 11/2003 | Willard | |
| 2007/0272743 A1 | 11/2007 | Christie et al. | |
| 2010/0276486 A1* | 11/2010 | Walsh ................... | G06Q 20/28 |
| | | | 235/380 |
| 2011/0178924 A1* | 7/2011 | Briscoe ............... | G06Q 20/409 |
| | | | 705/41 |
| 2014/0074704 A1* | 3/2014 | White ................. | G06Q 20/367 |
| | | | 705/41 |
| 2014/0201012 A1 | 7/2014 | Doran et al. | |
| 2015/0142657 A1* | 5/2015 | Sagastiverza ........ | G06Q 20/351 |
| | | | 705/44 |
| 2016/0260075 A1* | 9/2016 | deKozan ............ | G06Q 20/3224 |
| 2018/0276656 A1* | 9/2018 | Goyal ................. | G06Q 20/351 |
| 2020/0082373 A1 | 3/2020 | Kozak | |
| 2020/0311715 A1* | 10/2020 | Heidari ............. | G06Q 20/3276 |

FOREIGN PATENT DOCUMENTS

| | | |
|---|---|---|
| WO | 02/11028 A1 | 2/2002 |
| WO | 2021/212030 A1 | 10/2021 |

OTHER PUBLICATIONS

"Ritcha Ranjan, Tokenization of a physical debit or credit card for payment, Oct. 29, 2017".*
International Search Report and Written Opinion for PCT/US2021/027768, mailed Jul. 7, 2021, 15 pages.

* cited by examiner readySTATION®

Insert Cash

Please insert cash up to the amount you want loaded, then touch I'M DONE

Denominations accepted include:
$1, $5, $10, $20, $50, $100

$200.00 *Total Amount Inserted*

I'M DONE

Back readySTATION®

Figure 5F:
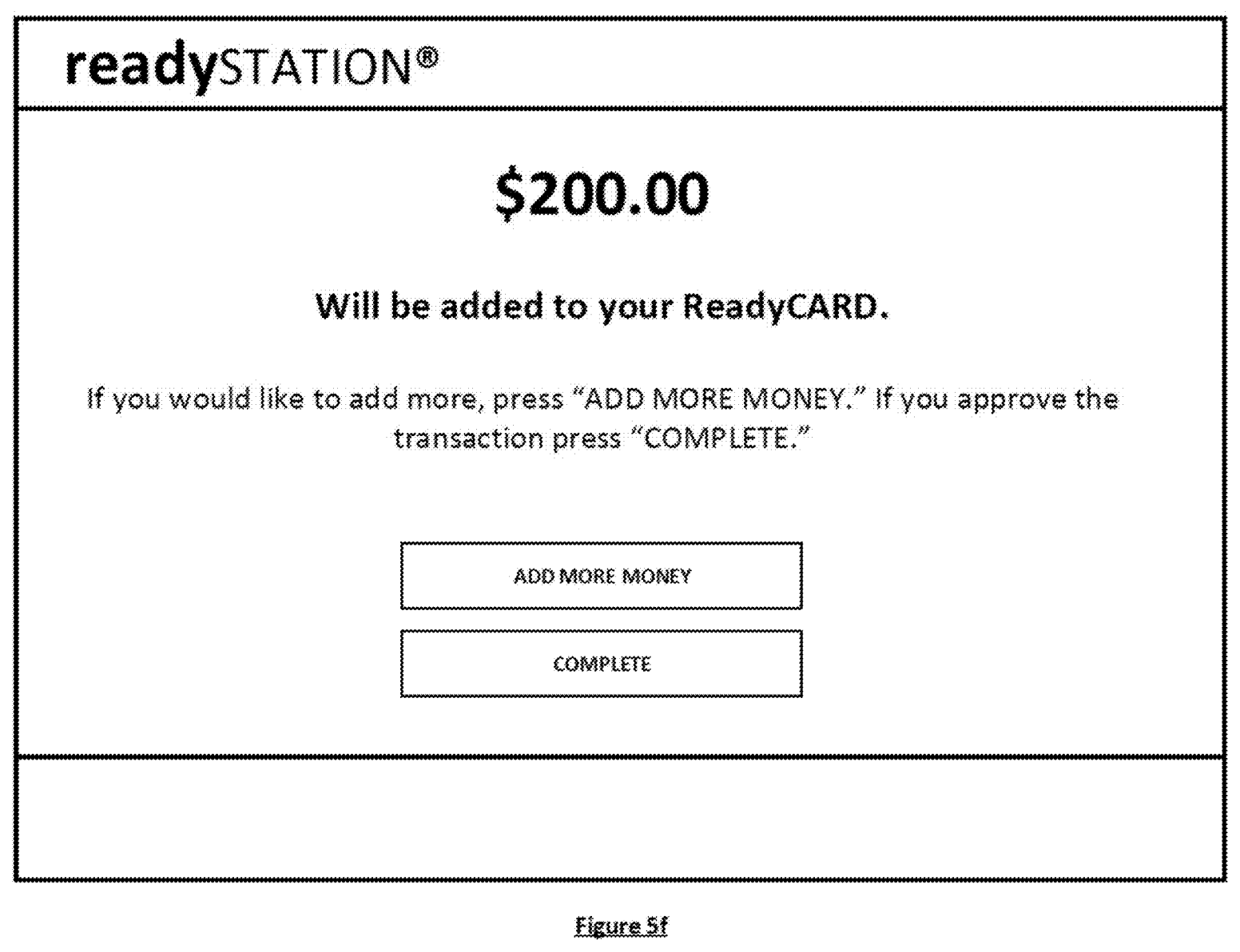

$200.00

Will be added to your ReadyCARD.

If you would like to add more, press "ADD MORE MONEY." If you approve the transaction press "COMPLETE."

ADD MORE MONEY

COMPLETE

Figure 5f readySTATION®

TRANSACTION COMPLETE

Please take your card.

Your cards is now ready to use.

Return to the app and press "My Wallet" to check balance and explore deals.

< ReadyDOME

Help

Important Information

* Check your Balance or Transactions History anytime at *xxbalances.com*

* A maximum of $1000 can be loaded onto the *ReadyCARD*

* The *ReadySTATION* does not give change or refunds once cash is inserted

* The *ReadySTATION* accepts $1, $5, $10, $20, $50, and $100 bills.

Click below to access cardholder and cashless operations questions.

Questions?     >

Figure 6l

< ReadyDOME

My Wallet

*readyCARD*
debit 5432  7501  2345  6789

08/22

READYCARD PREPAID CARD

Current Balance:

$200.00

Add Card or Cash     >

Figure 6k

ISSUING A VIRTUAL VALUE-BEARING CARD ASSOCIATED WITH ONLY NON-PERSONALLY IDENTIFYING INFORMATION FROM A KIOSK

CROSS-REFERENCE TO RELATED APPLICATIONS

This application claims the benefit of U.S. Provisional Patent Application No. 63/011,559, filed, Apr. 17, 2020, entitled, "SYSTEMS AND METHODS FOR EXCHANGING CASH TO DIGITAL FORM," and U.S. Provisional Patent Application No. 63/065,715, filed, Aug. 14, 2020, entitled, "ISSUING A VIRTUAL VALUE-BEARING CARD ASSOCIATED WITH ONLY NON-PERSONALLY IDENTIFYING INFORMATION FROM A KIOSK." The disclosure of these priority applications are hereby incorporated by reference in their entirety into the present application.

TECHNICAL FIELD

The invention relates to a system and method for initializing a stored value account, more particularly a system and method for issuing a virtual value-bearing card and an optional physical value-bearing card associated with only non-personally identifying information, and still more particularly, wherein the virtual card is issued by a kiosk.

BACKGROUND OF THE INVENTION

Stored value accounts (i.e., debit accounts and prepaid gift card accounts) enable users to conduct transactions using a card similar to a credit account. Debit cards, therefore, enable users to conduct transactions without the need for carrying cash or checks. When used to make purchases, debit cards often require the user to enter a personal identification number (i.e., a PIN). Consequently, debit cards include a security feature over carrying cash. Debit cards also enable users to conduct transactions in which cash cannot be used, such as purchasing products and services over the phone or Internet. However, unlike a credit card account, a stored value account only enables a user to complete a transaction if the user has already deposited a sufficient amount of value into the associated account.

In prior systems, to initialize a stored value account and obtain a debit card, a user physically visited a bank branch. The user would meet with an available bank representative. Then, the user would present personal information that enabled the bank representative to verify the identification of the user. The bank optionally conducted further research on the user, for example, checking the user's credit report. The personally identifying information (i.e., information identifying a specific user) would be associated with the stored value account in the records of the bank. In most cases, the personally identifiable information would be indicated on the card or stored in a readable format on the card. Such prior systems can be inconvenient and personally intrusive.

In other prior systems, while users were able to obtain debit cards at locations other than banks, they were still required to complete an application and to provide personal information to obtain the card or in order to access the funds they had deposited. Accordingly, the same drawbacks existed in these other prior systems.

Such practices are one reason that a significant portion of the population is underserved or distrusting of the banking system. This "under-banked" portion of the population is generally excluded from traditional banking products such as checking accounts, credit cards, and debit cards. For example, the under-banked population includes individuals having poor credit history, individuals requiring immediate credit, and individuals having no established credit history. Further examples of the under-banked populace include individuals of limited means and/or who distrust banking institutions. Yet another example of the under-banked populace includes individuals wanting to maintain a consistent credit report in preparation for a major purchase. Another subset of under-banked individuals includes "unbanked" individuals. An unbanked person is a person who does not have a banking relationship with a traditional financial institution, such as a commercial bank or savings loan.

The need for debit cards has been heightened by three converging factors including merchants unwilling to handle physical cash and coins because of fears of contamination of the same, the high cost of cash handling, and speed of processing transactions—especially at high customer turnover locations (for example concession stands in sporting and concert arenas and stadiums).

In addition, multiple point of sale locations, at events in stadiums and at festivals, may increase the need for security at each point-of-sale location if cash is accepted. Requiring credit card transactions may provide a solution to the need for security, but does not address the needs of consumers who bring cash to pay for transactions.

In one prior system, a debit card may be issued from a kiosk remote from a bank. In that system, the kiosk does not receive any personally identifying information. This system is described in U.S. Pat. Nos. 7,766,225 and 8,893,963. However, even greater speed, flexibility and convenience would be desirable.

In view of the foregoing, there is a need in the art for convenient, non-intrusive systems and methods of issuing virtual debit cards and prepaid gift cards. Such a system and method would preferably provide for the issuance of the cards without requiring the recipient to provide any personally identifying information. The present invention overcomes the shortcomings of the prior art and addresses these needs in the art.

SUMMARY OF THE INVENTION

The invention relates to a method and system for converting forms of value bearing instruments into a convenient form of an electronically hosted "virtual" bank regulated debit card (prepaid or gift card, each a "debit card" and/or "value-bearing card")(referred to collectively herein as a "value-bearing card") with which preferably only non-personally identifying information is associated. In a preferred embodiment, the conversion is performed electronically using a kiosk and an internet enabled device. The internet enabled device may utilize a cellular, wi-fi, hardwired or other known manner of connecting to the internet. The internet enabled device may take the form of smart phones, tablets, laptops, personal computers, wearable devices, and other devices. The kiosk may include the following physical components (a) a bill acceptor; (b) a network coupler; (c) a display screen; (d) an input device; (e) a 2d or 3d bar code reader (e.g., a QR code reader); (f) a virtual card initiator (processor); and (f) a receipt printer. The kiosk may also include a physical card dispenser.

As noted above, the physical components of the kiosk may take the form of an asset acceptor, a network coupling, and virtual card initiator. The asset acceptor is configured to receive assets, such as currency, checks, and credit cards, from a user. The network coupling is configured to enable communication with an external computer or computer network. In some embodiments, the network coupling is configured to communicate with an application server communicating with an application on the internet enabled device.

The network coupling may also communicate with a central server. The central server is configured to obtain authorization for initializing a debit account (or prepaid gift card account) from a card processor. In other embodiments, the network coupling is configured to communicate directly with a card processor.

The virtual card initiator is configured to link a code generated from the application on the internet enabled device and the value of assets received by the kiosk asset acceptor. The linked information is sent to the operator of the application on the internet enabled device together with a request to generate the virtual value-bearing card, activate the card, load funds onto the card and to add the card to the application (often referred to as a virtual "wallet"). In this manner, the information required by the kiosk transaction includes only information that does not identify the specific user. Further, the system and method provides for obtaining a virtual value-bearing card from a self-service kiosk almost immediately and anonymously. A physical value-bearing card may be dispensed to the user from the kiosk at the same time.

One advantage of a system and method constructed in accordance with the principles of the present invention is that the virtual value bearing card (and associated account) provides a solution for cashless facilities and/or environments. Another advantage is that the virtual card may be limited to use at the specific facility, a limited group of stores/vendors, or may be used in an open loop at all stores that accept such cards. Still another advantage is that the large unbanked population may now be able to make transactions within a facility that does not accept cash using an internet connected device that can access the card account electronically. In addition, the virtual card is may be created on the spot without the need for personally identifiable information. Further, by being able to be stored on an application ("app") on an internet enabled device, especially on readily portable devices such as smart phones, wearables, tablets, and pads, added flexibility and convenience is provided to the user.

Therefore, according to one aspect of the invention, there is provided a system for issuing a virtual value-bearing card, the system comprising: an input device, the input device being configured to receive input from a user, the input including a code initiated by an application running on a remote internet enabled device, whereby the code does not identify the user; an asset acceptor, the asset acceptor being configured to receive assets, and an asset acceptor controller, the controller being configured to determine a value of the received assets; a virtual card initiator operationally coupled to the input device and the asset acceptor, the virtual card initiator configured to review the code and the value of the received assets and generate a message requesting that a virtual value-bearing card be activated; and a network coupling, the network coupling operationally connected to the virtual card initiator and configured to send the message to a prepaid card acquirer in order to generate and activate the virtual value-bearing card, load the received assets on the virtual value-bearing card, and to populate the virtual value-bearing card onto the application running on the remote internet enabled device, wherein the virtual value-bearing card added to the remote device includes only information that does not identify the specific user, the information including an account number.

According to another aspect of the invention, there is provided a method for adding value to a virtual value-bearing card, the method comprising: receiving a code from a remote internet enabled device arranged and configured to store a virtual value-bearing card in a wallet application; scanning or inputting the code and validating the code by transmitting a message to the wallet application, the code including only non-personally identifiable information; adding value to a temporary account associated with the code from assets provided by a user; and sending a message to a value-bearing card acquirer to generate and activate the virtual value-bearing card, load the received assets on the virtual value-bearing card, and to populate the virtual value-bearing card onto the application running on the remote internet enabled device, wherein the virtual value-bearing card added to the remote device includes only information that does not identify the specific user, the information including an account number.

In yet another embodiment, a system for exchanging cash to one or more digital forms is presented. The system includes a touch screen for accepting input from a customer, a scanner for communicating with the mobile device of the customer, a cash input for accepting and validating cash from the customer, a card output for dispensing a credit or a debit card to the customer, and a network interface for communication with at least one financial service or virtual payment provider. The system is configured to exchange the cash input from the customer to a digital form and load the digital form of the cash onto the mobile device of the customer using the scanner.

While the invention will be described with respect to preferred embodiment configurations and with respect to particular devices used therein, it will be understood that the invention is not to be construed as limited in any manner by either such configuration or components described herein. Also, while a particular embodiment kiosk is described herein and a particular logical flow to establish and add value to the virtual card, it will be understood that such particular kiosk and logical flow is not to be construed in a limiting manner. Instead, the principles of this invention extend to any environment in which a virtual value bearing card associated with only non-personally identifying information is issued. These and other variations of the invention will become apparent to those skilled in the art upon a more detailed description of the invention.

The advantages and features which characterize the invention are pointed out with particularity in the claims annexed hereto and forming a part hereof. For a better understanding of the invention, however, reference should be made to the drawings which form a part hereof and to the accompanying descriptive matter, in which there is illustrated and described a preferred embodiment of the invention.

BRIEF DESCRIPTION OF THE DRAWINGS

In the drawings in which like elements are identified with the same designation numeral:

FIGS. 5a-5h are example illustrations of screen displays that may be used on a kiosk during the operational flow of FIGS. 3a and 3b.

DETAILED DESCRIPTION

The invention relates to methods and systems for exchanging forms of value bearing instruments for a convenient value bearing form associated with only non-personally identifying information. In particular, the invention relates to methods and systems for transferring monetary value to a virtual value-bearing card without requiring submission of personal information. As used herein, the term "prepaid card" includes both bank regulated debit and gift card accounts.

Figure 1:
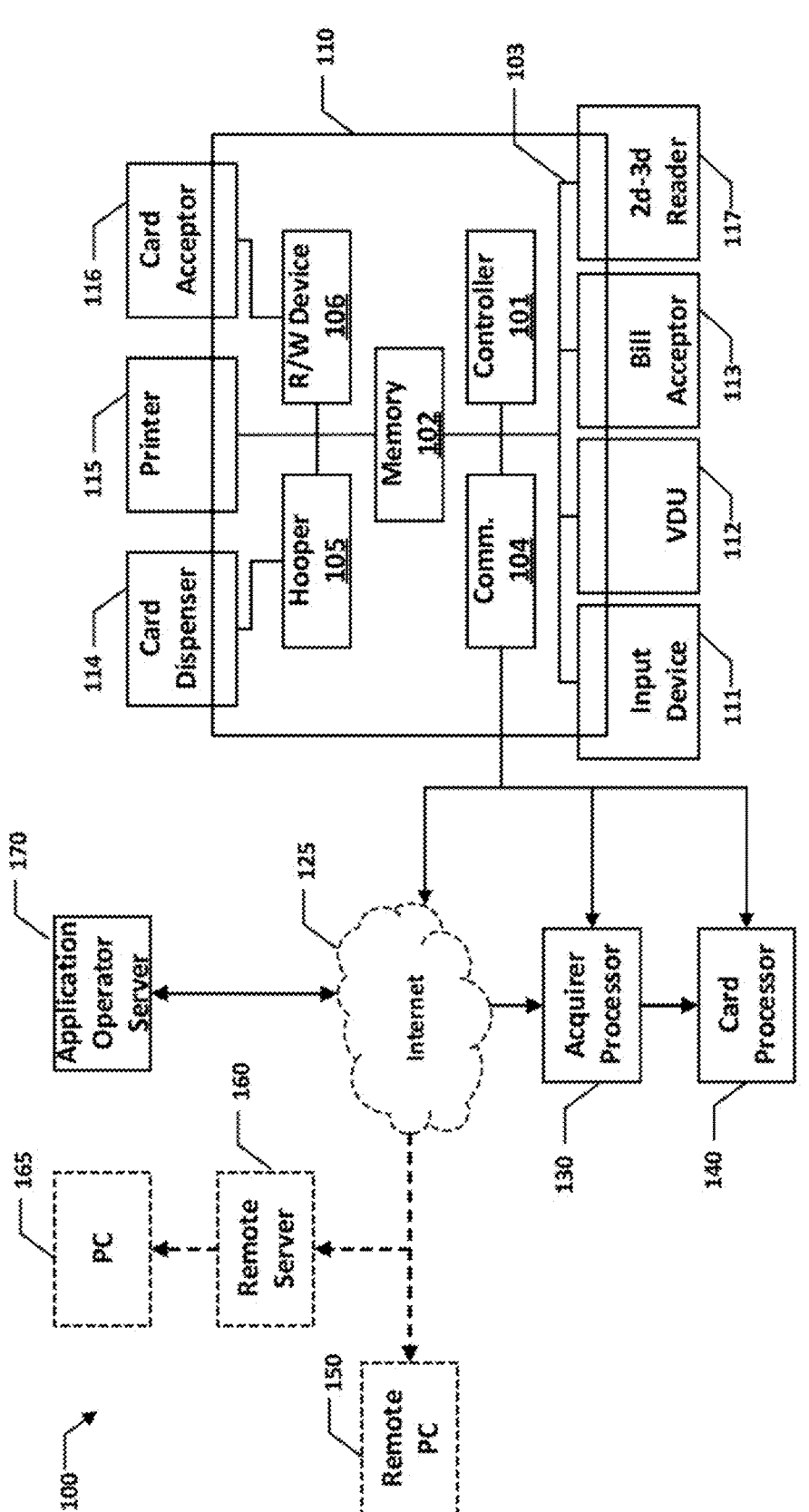
FIG. 1 illustrates a system which may be used to implement an embodiment of the present invention.

FIG. 1 illustrates a block diagram of an example hardware and operating environment for implementing the teachings of the present disclosure. FIG. 1 provides an overview of computer hardware (e.g., a kiosk) and a suitable computing environment in conjunction with which some embodiments of the present invention can be implemented. The system is shown generally at 100.

Some embodiments of the present invention are described in terms of a computer executing computer-executable instructions and/or as a process flow together with associated screen displays for implementing an embodiment of the invention. However, some embodiments of the present invention can be implemented entirely in computer hardware in which the computer-executable instructions are implemented in read-only memory. Some other embodiments of the invention can also be implemented in client/server computing environments where remote devices that are linked through a communications network perform tasks. Program modules can be located in local, cloud, and/or in remote memory storage devices in a distributed computing environment.

In general, kiosk 110 includes a controller 101 operatively coupled to multiple internal components by a system bus (illustrated in FIG. 1 as the connections between the functional blocks within kiosk block 110). Embodiments of the present invention are not limited to any specific type of kiosk 110, however. In some embodiments, the controller 101 is configured to execute kiosk software. In other embodiments, the controller 101 is configured to operate other system components. For example, the controller 101 can include a computer processor commercially available from Intel, Motorola, Cyrix and other such companies.

In some embodiments, an operating system, kiosk software, and other desired data can be stored on a system memory 102. Some examples of system memory 102 include random-access memory (RAM), read-only memory (ROM), and one or more mass storage devices. In other embodiments, however, an embedded system can be used to increase security and minimize service calls. For example, the operating system, software, and/or data can be embedded onto a solid-state chip. In one such embodiment, the operating system can be programmed onto a solid state chip and transactional data and logs/files can be accumulated onto a Flash memory or a similar solid state device.

Furthermore, kiosk 110 can be communicatively connected to the Internet 125, a private network, or a virtual private network via a communication device 104. One example of a private network can be established by routing network cables only between parties to the network. Virtual networks enable parties to emulate a private network over a public telecommunications infrastructure. For example, software or firmware can create an encrypted "tunnel" enabling data traffic to pass between the parties, but not to a third party.

Network connectivity is well known within the art. The communication device 104 of kiosk 110, which can be internal or external, is connected to the system bus. In one example embodiment, the communication device 104 is a modem that responds to communication drivers to connect to the Internet via a "dial-up connection." In another example embodiment, the communication device 104 is an Ethernet or similar hardware (network) card connected to a local-area network (LAN) that itself is connected to the Internet via a "direct connection." In yet another example embodiment, the communication device 104 includes a wireless connection to the Internet. In the latter example, the connection may be made via a cellular connection or a wireless connection to a remote modem and/or router. Embodiments of the present disclosure are not limited to any particular type of network connection device 104.

In other embodiment, the communication device 104 can include a firewall. Generally, a firewall manages who and what has access to the systems being protected by the firewall. Typically, firewalls are used to protect a private network, especially those used in conjunction with public telecommunications networks. As known in the art, firewalls can be implemented through either hardware or software.

In some embodiments, the kiosk 110 can operate in a networked environment using logical connections to one or more remote computers, such as an acquirer processor 130 (discussed further below with reference to FIG. 2), a card processor 140 (discussed further below with reference to FIG. 2), or another remote computer. In some embodiments, example remote computers include another computer 150, a server 160, and a network PC 165. In one embodiment, the remote computer 150 is configured to download configuration and/or diagnostic software to the kiosk 110. In another embodiment, the remote computer 150 includes a database for storing parameters used by the kiosk 110 in conducting various transactions. In other example embodiments, however, the remote computer 150 can also include a router, a client, a peer device, a mobile device such as a cell phone, internet or cell phone connected tablet, Personal Digital Assistant (PDA), and any other suitable network node.

In some embodiments, the kiosk 110 is also connected to a remote application server 170. Such connection includes over the internet 125, and may occur in a variety of manners as discussed above. The application server 170 may be connected to and/or able to communicate with a plurality of internet enabled devices (best seen in FIG. 2). The application server 170 is used in embodiments as part of initiating and enabling virtual value-bearing cards.

The kiosk 110 preferably includes a 2D-3D reader 117. The reader 117 is used to read bar codes, 3-dimensional codes and other QR style codes. The reader 117 is connected to the controller 101 director or connected via the system bus. In one embodiment the reader 117 is used as part of the initiation process associated with initiating and enabling virtual value-bearing cards (described further below).

In some embodiments, the kiosk 110 further includes a hopper 105. The hopper 105 contains one or more pre-printed debit cards configured for distribution. Each debit card in the hopper 105 corresponds with an uninitialized account with a card processor (shown in FIG. 2). In other example embodiments, the kiosk 110 includes a read device 106. The read device 106 is configured to read a debit card inserted into the device, for example, through a card acceptor 116 discussed below. In some embodiments, the read device 106 is a read/write device configured also to write to the inserted debit card. In particular, the read/write device 106 is configured to encode information, such as an account number, on the inserted card. In one embodiment, the device 106 encodes the information onto a magnetic strip. In another embodiment, the device 106 encodes the information onto an integrated circuit chip. In still another embodiment, a contactless card or smart card may be used. Such cards may include radio frequency technology. In these cases, the radio frequency device may include the information (such as an account number) in advance, or the device 106 may encode such information.

In general, the kiosk 110 is operatively coupled to an input device 111, a display device 112, a bill acceptor 113, a card dispenser 114, a printing device 115, and a card acceptor 116. Kiosk 110 can be operated using at least one operating environment to provide a graphic user interface including the display screen 112 and input device 111. Such operating environments include, by way of example, operating systems such as versions of the Android, Microsoft Windows and Apple MacOS operating systems which are well known in the art. However, embodiments of the present invention are not limited to any particular operating environment and the construction and use of such operating environments are well known within the art.

A user enters commands and information into the kiosk 110 through the input device 111. Input device 111 permits interaction with the graphic user interface (GUI) of the kiosk 110 to navigate through menus and select options provided by the GUI. Examples of input device 111 include touch screens, mice, touch pads, trackballs, remote controls, point sticks, tactile devices and keyboards. However, embodiments of the present invention are not limited to any particular input device 111. The input device 111 is operatively coupled to the system bus.

Display device 112 permits the display of information, including computer, video, textual, and other information, for viewing by a user of the kiosk 110. Such display devices include cathode ray tube (CRT) displays (monitors), as well as flat panel displays such as liquid crystal displays (LCD's). Embodiments of the present invention, however, are not limited to any particular display device 112. Display device 112 is operatively coupled to the system bus. In some examples, the display device 112 also acts as the input device 111. For example, in one embodiment, the display device 112 is a touch screen. In addition to an input device 111 and a display screen 112, other example embodiments of a kiosk 110 may include other peripheral input/output devices such as speakers. Representative screen shots which may appear on the display device 112 in connection with initiating and enabling a virtual value-bearing card (and/or physical card) are described further below in connection with FIGS. 5a-5h.

Bill acceptor 113 is configured to receive and determine the value of one or more value bearing instruments or monetary forms inserted by the user. For example, in some embodiments, bill acceptor 113 is configured to accept paper currency. In one embodiment, bill acceptor 113 is configured to accept U.S. dollar bills in particular increments, such as $10, $20, $50, and $100 increments. In other embodiments, bill acceptor 113 is configured to accept other value bearing forms such as personal checks, traveler's checks, credit cards, debit cards, coins, and tokens. Bill acceptor 113 can be configured to accept a variety of value-bearing forms and/or include a plurality of different bill acceptors 113 in order to accommodate the different types of value-bearing forms desired to be accepted. The bill acceptor 113 is operatively coupled to the system bus.

Card dispenser 114 is configured to dispense an optional physical debit card to the user. In some example embodiments, the cards are pre-loaded into the hopper 105 and the hopper is operatively coupled to the card dispenser 114. In this embodiment, the card dispenser 114 dispenses the next card in the hopper 105. The card dispenser 114 is operatively coupled to the system bus.

The printing device 115 is configured to print a receipt for the user. In some example embodiments, the printing device 115 is configured to print a receipt including a current balance. In other embodiments, the printing device 115 is configured to print a receipt including the number of allowed reloads (if any and/or if allowed) the user has remaining. The printing device 115 is operatively coupled to the system bus.

The card acceptor 116 is configured to read information stored on a dispensed card. In some example embodiments, the card acceptor 116 is configured to hold the card throughout a transaction. In other example embodiments, the card acceptor 116 is configured to read a card as the card is swiped past a sensor (e.g., a magnetic stripe and/or a radio frequency device may be read). The card acceptor 116 is operatively coupled to the system bus. In one example embodiment, the card acceptor 116 is further configured to encode information on the debit card. For example, in one embodiment, a current account balance is stored on a card. In other embodiments, however, the card acceptor 116 encodes any desired information except information personal to the user on the card.

Figure 2:
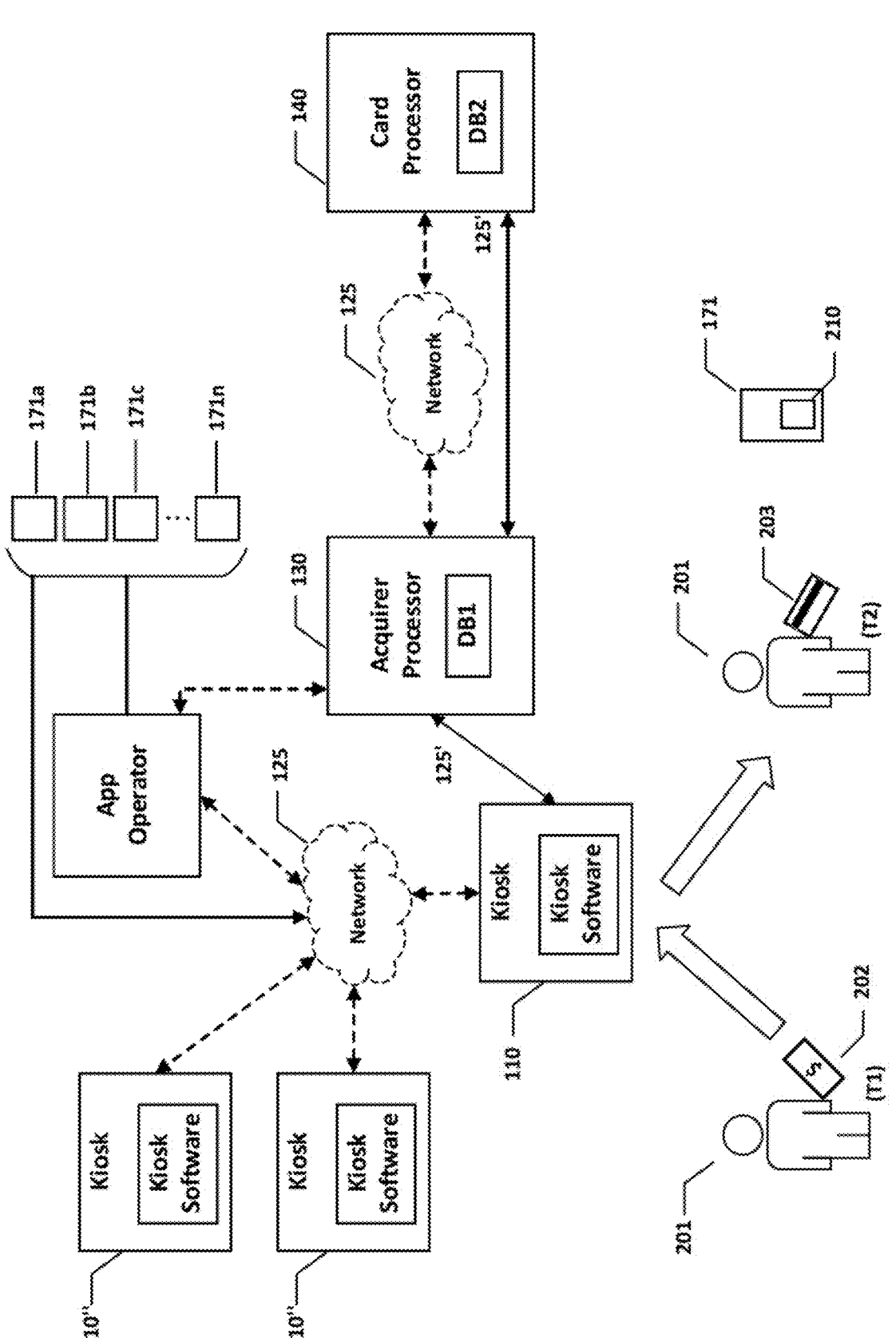
FIG. 2 illustrates a network which may be used in connection with the system of FIG. 1 to implement an embodiment of the invention.
Figure 3A:
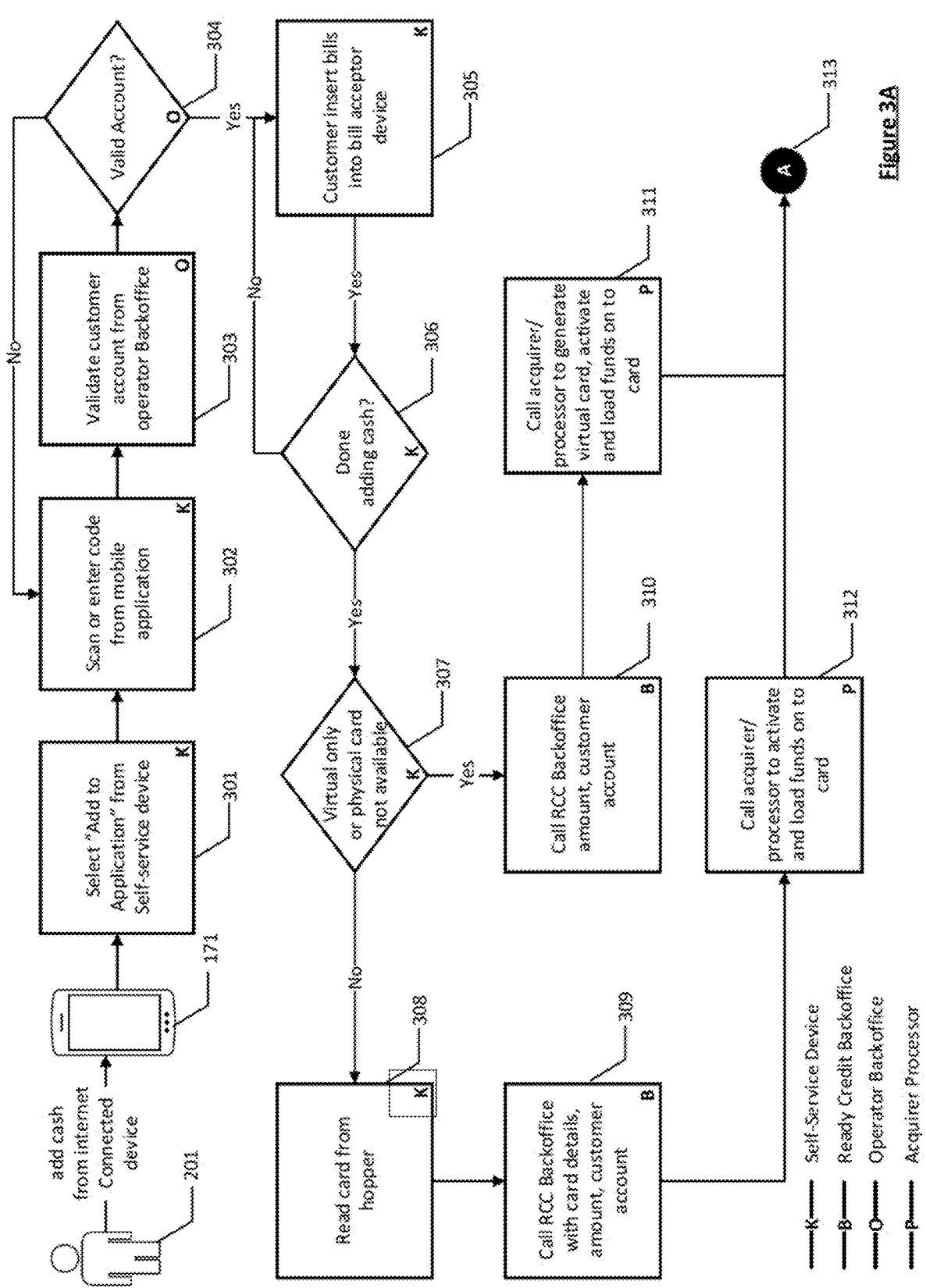
FIGS. 3a and 3b illustrates an example operational flow for establishing and adding value to a virtual value-bearing card in accordance with an embodiment of the present invention.
Figure 3B:
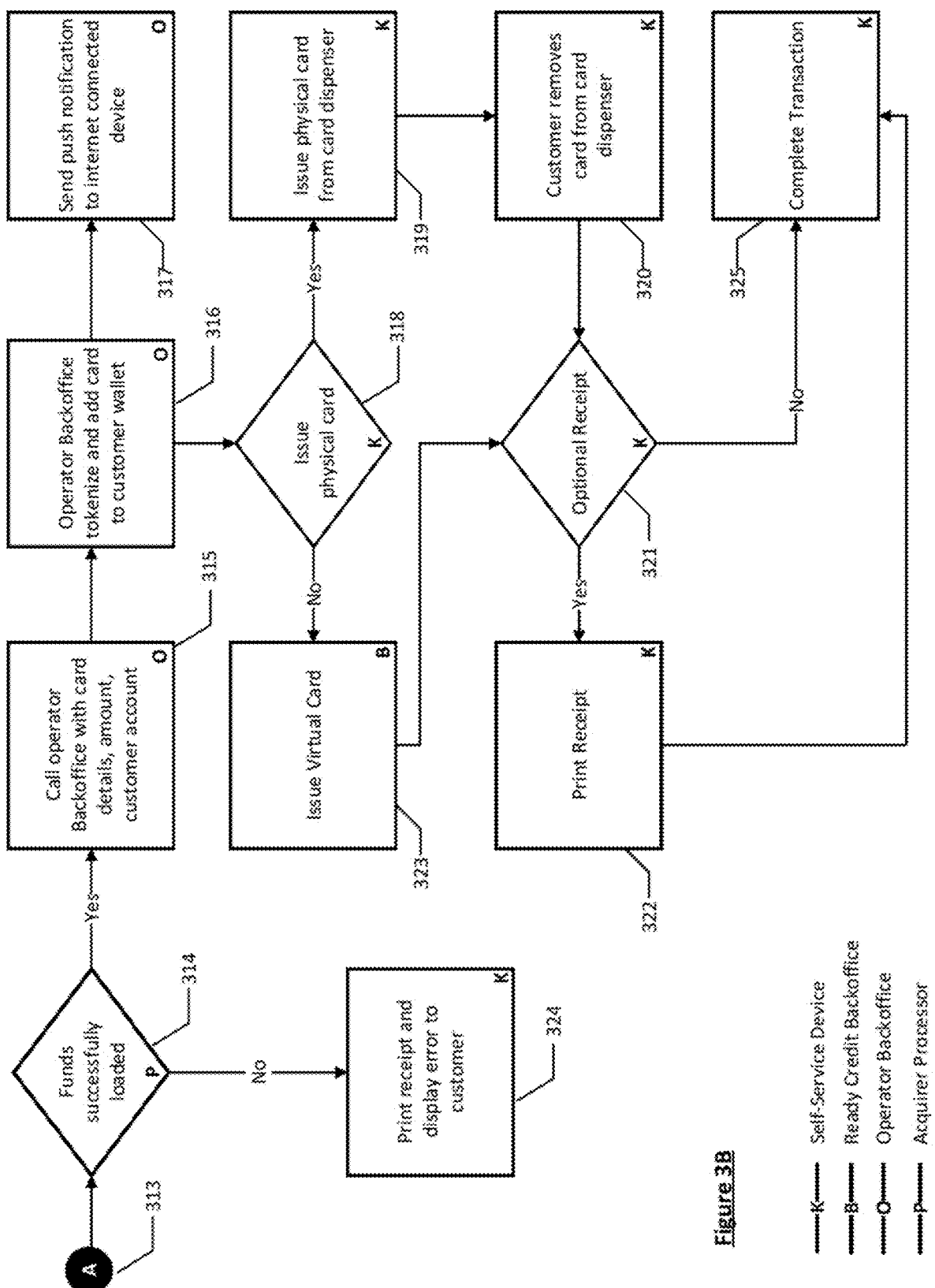

Referring now to FIG. 2, a user 201 can conduct an obtain transaction using the kiosk 110. The obtain transaction includes obtaining from the kiosk 110 a virtual value-bearing card 210 associated with a user account and initializing the user account with a card processor 140. A physical value-bearing card 203 may also be issued by the kiosk 110, where the physical value-bearing card 203 preferably includes the same user account information as the virtual value-bearing card 210. The virtual value-bearing card 210 is preferably stored as part of an application running on an internet enabled device 171, such as a personal computer, smart phone, wearable device, tablet, etc. For example, the virtual value-bearing card can be stored in the wallet of the application. It will be appreciated that there may be a plurality of internet enabled devices 171a-171n used by a plurality of different users 210. The obtain transaction is discussed in more detail further below with respect to FIGS. 3A and 3B.

FIG. 2 illustrates a network 200 for implementing the obtain transaction. The network 200 includes a plurality of kiosks 110, 110', 110", an acquirer processor 130, a card processor 140, and an application processor 170. A user 201 inputs currency or other value-bearing instruments 202 into the kiosk 110 at a first time T1 and is issued a virtual value-bearing card debit card 210 on the user's internet enabled device 171 (together with an associated optional physical value-bearing card 203) at a second time T2 after utilizing the kiosk 110. In other embodiments, cryptocurrency may be used as a source of funds by the user.

In some embodiments, an account number is pre-encoded onto a physical version of the card (not shown). Further, in some embodiments, the value-bearing card 210, 203 may have an expiration and/or an annual fee structure. In one embodiment, the expiration date is one year from the date of issuance.

However, information personal to the user is not encoded on the card 203 and is not required in order to receive the value bearing instruments 202 or to initialize and dispense the value-bearing card 203, 210 by the kiosk. In some embodiments, the card 203, 210 is branded to reflect the card processor 140 associated with the account number stored on the card 203. For example, the card 203 may be branded as a VISA™, MASTERCARD™, AMERICAN EXPRESS™, or as some other brand and/or generic card.

The kiosk 110 includes a device, such as bill acceptor 113 of FIG. 1, configured to accept value-bearing instruments 202 and a device, such as card dispenser 114 of FIG. 1, to dispense a prepaid card 203. Kiosk 110 is also arranged and configured to communicate to an application processor 170. In some embodiments, the application processor 170 initiates the obtain transaction in connection with virtual value-bearing cards 210. More specifically, as described in more detail below, a user 201 downloads an application onto their internet enabled device 171 in which credit and debit cards may be stored in a virtual wallet in the application.

The application may be implemented by providing an "Add Cash" module to an existing "Add Card/Value" workflow. This may be implemented on a mobile, website, desktop, or other type of consumer facing application. In accordance with the embodiment described herein, the application generates a 2d or 3d barcode (or equivalent alphanumeric code) that represents a relationship to the customer account record. This identifier may be time based, hashed phone number, internal database record id, or another structure that does not represent any personally identifiable information.

The application may initiate the transaction and provide the generated 2d or 3d bar code on a display of the internet enabled device 171. The kiosk reader 117 is arranged and configured to read the bar code and provide the same to the controller 101 to begin the transaction. In some embodiments, a several digit and/or alphanumeric code may be provided to the internet enabled device 171 by the application (e.g., by the application processor), instead of a bar code, which is then keyed into the kiosk 110 via an input device 111 to initiate the transaction.

In other example embodiments, the kiosk 110 is configured to enable a user 201 to check a balance on a previously acquired card 203. In some embodiments, the kiosk 110 is configured to print receipts indicating the balance placed on the card 203. In still other embodiments, the kiosk 110 is configured to add value to the card 203.

In some other example embodiments, each kiosk 110, 110', 110" is configured to electronically communicate with the acquirer processor 130, which then communicates with the card processor 140 to initialize a user account with the card processor 140. For example, in one embodiment, a network connection 125 provides electronic communication between the kiosk 110, the acquirer processor 130, and the card processor 140. In other example embodiments, the kiosk 110, the acquirer processor 130, and card processor 140 are electronically communicatively coupled to one another via a direct line 125'. In other embodiments, the kiosks 110, 110', 110" are configured to communicate directly with the card processor 140.

The acquirer processor 130 may include a server system coupled to each kiosk 110, 110', 110". In some embodiments, the acquirer processor 130 maintains configuration files storing standard parameters for each kiosk 110, 110', 110". In other example embodiments, each kiosk 110, 110', 110" maintains a local configuration file (not shown) storing standard parameters.

In some embodiments, a configuration file includes a maximum balance a user may deposit to a card when first obtaining the value-bearing card 203, 210. In one embodiment, the maximum balance is $100. In other embodiments, a configuration file includes a minimum balance that a user may deposit to a card when first obtaining the card. In one embodiment, the minimum balance is $20. In still other embodiments, a configuration file specifies that a card balance cannot be reloaded or cannot be reloaded more than a particular number of times and that the reload value cannot exceed a certain value. For example, one configuration file may specify that a card cannot be reloaded more than three times and that no more than $500 can be added per reload. Further examples of configuration parameters include transaction fees and permitted bill denominations.

In some embodiments, the acquirer processor 130 includes a database DB1 of account information for each account associated with a debit card 203 loaded in a kiosk 110. For example, in one embodiment, the database DB1 stores the number of times the balance on the card 203 has been reloaded (i.e., the number of times value has been added to the card 203 after being dispensed to the user).

The card processor 140 is the entity that issues and manages the user accounts. The card processor 140 also determines whether to authorize purchase transactions between the user 201 and various merchants. In some example embodiments, the card processor 140 is a bank. In other example embodiments, the card processor 140 is a non-bank, financial service company. In some embodiments, the card processor charges a periodic maintenance fee or other fees to the account. For example, in one embodiment, the card processor deducts $4.95 per month in maintenance fees from the card account.

The card processor 140 includes a database DB2 of card accounts. In general, the database DB2 stores the status of each account, a current balance of each account, and tracking data for each account. For example, in some embodiments, the account status information includes one of "Awaiting Initialization," "Enabled," "Disabled," and "Lost or Stolen." In one example embodiment, the database DB2 also stores information regarding the number of times the card 203 has been reloaded.

Figure 5A:
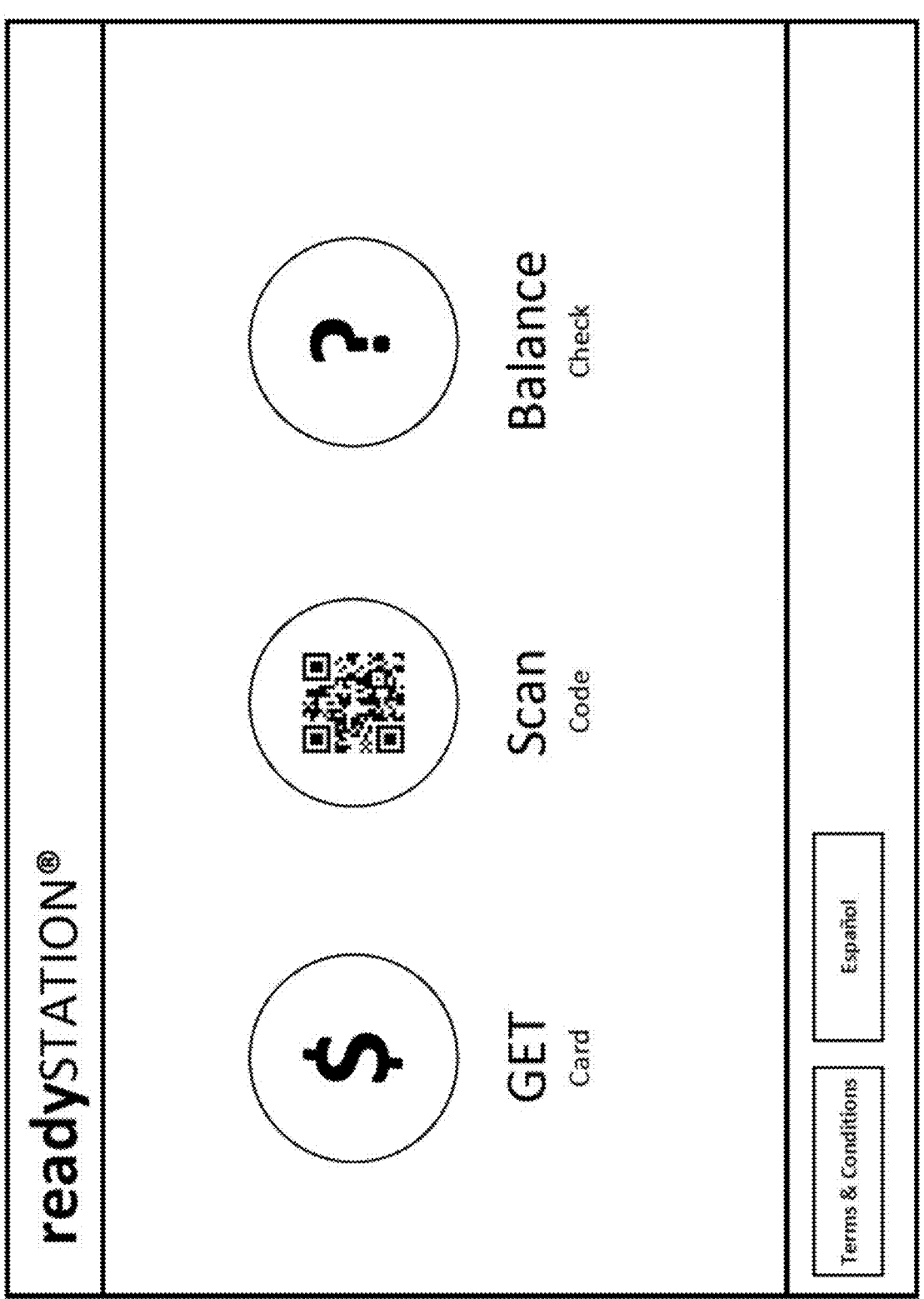
Figure 5B:
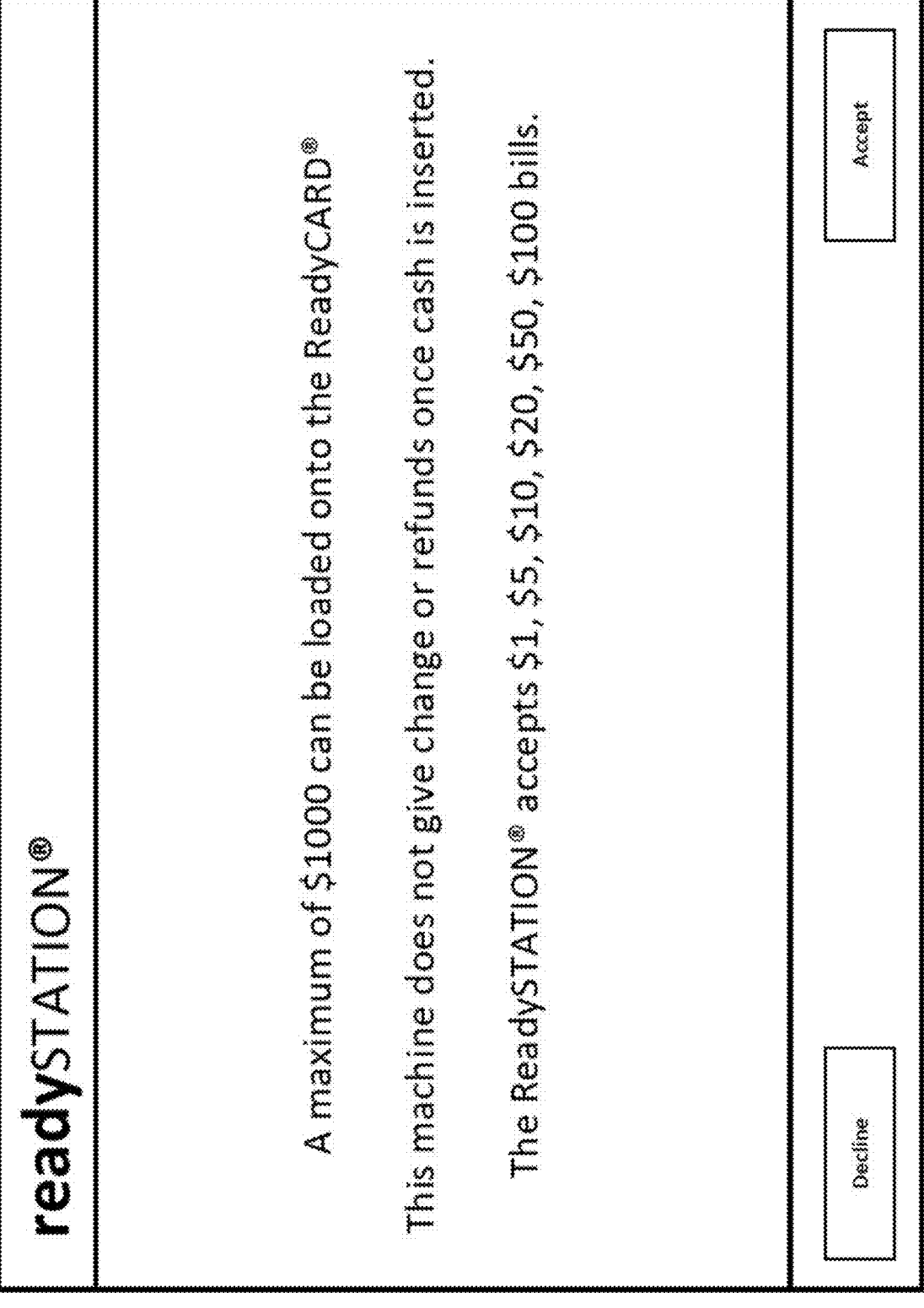
Figure 5C:
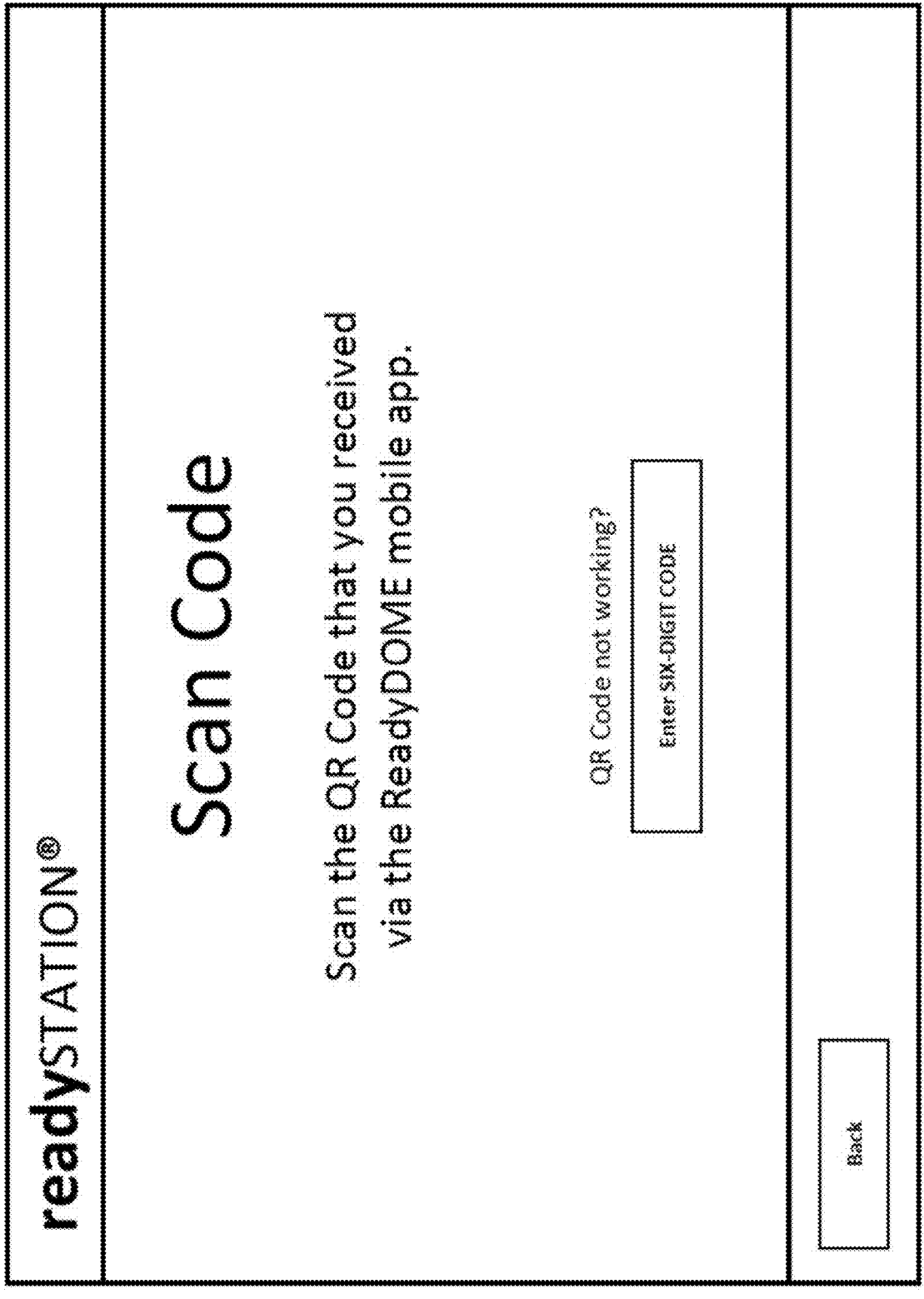
Figure 5D:
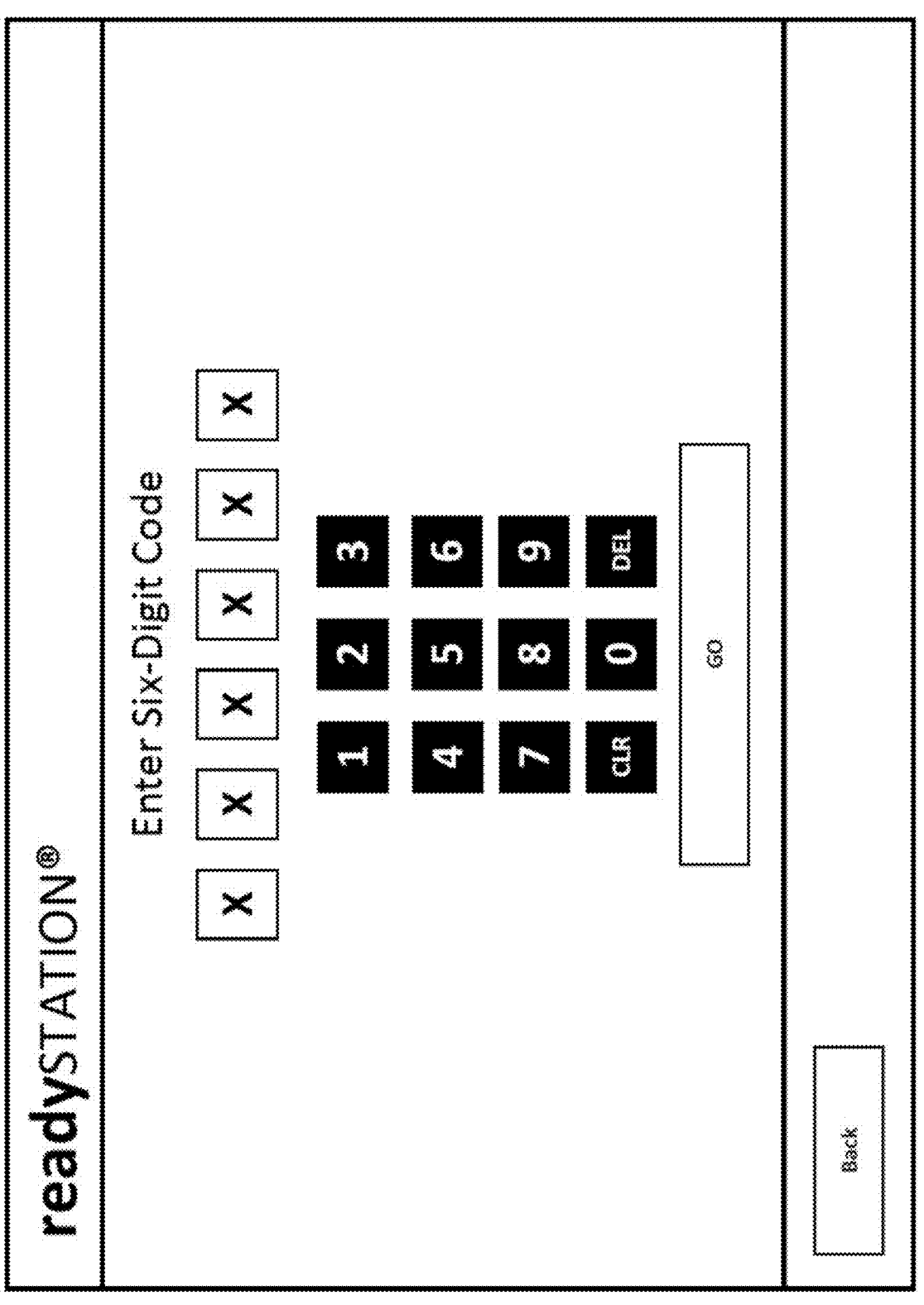
Figure 5E:
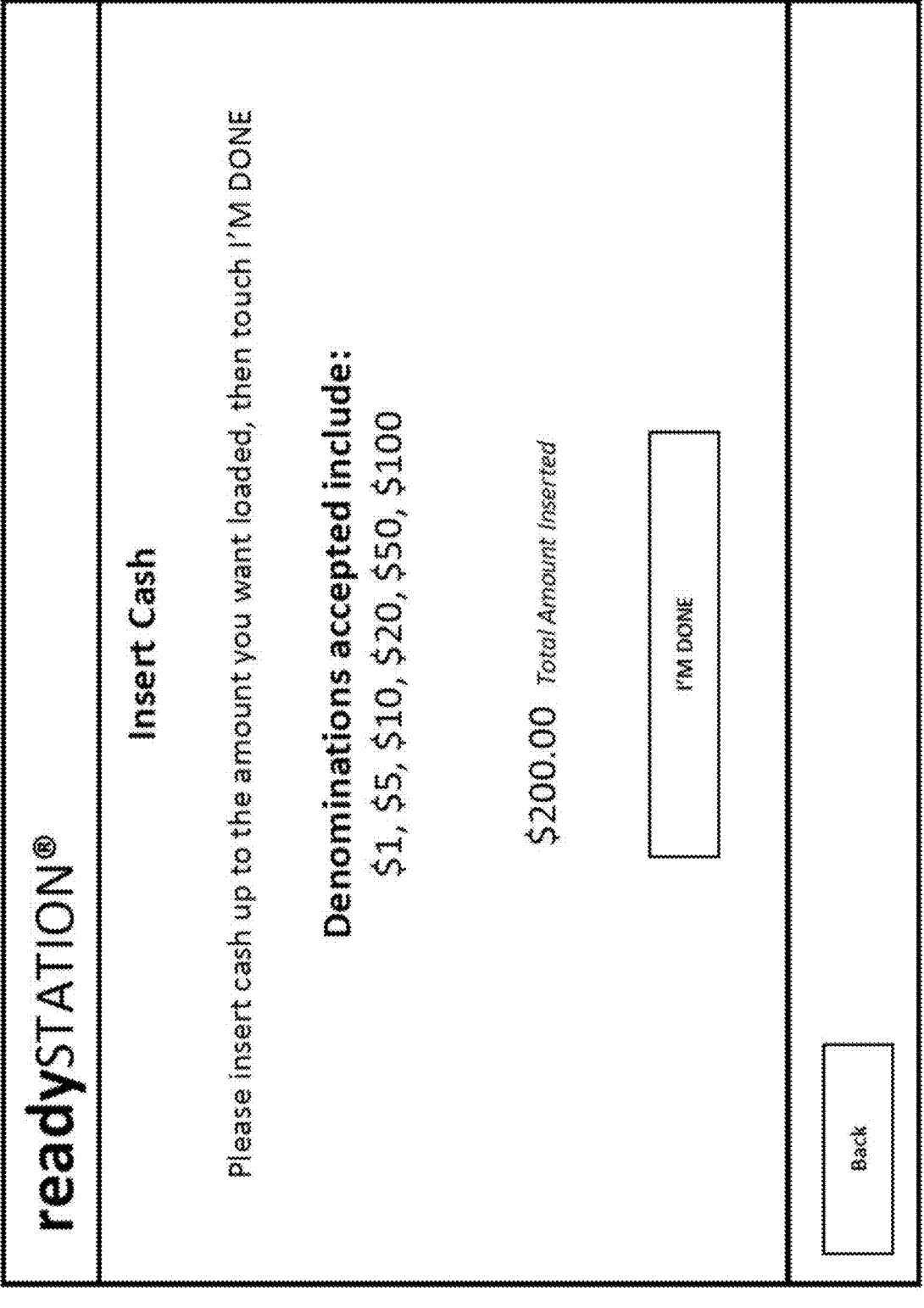
Figure 5G:
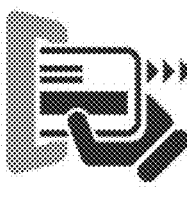
Figure 5H:
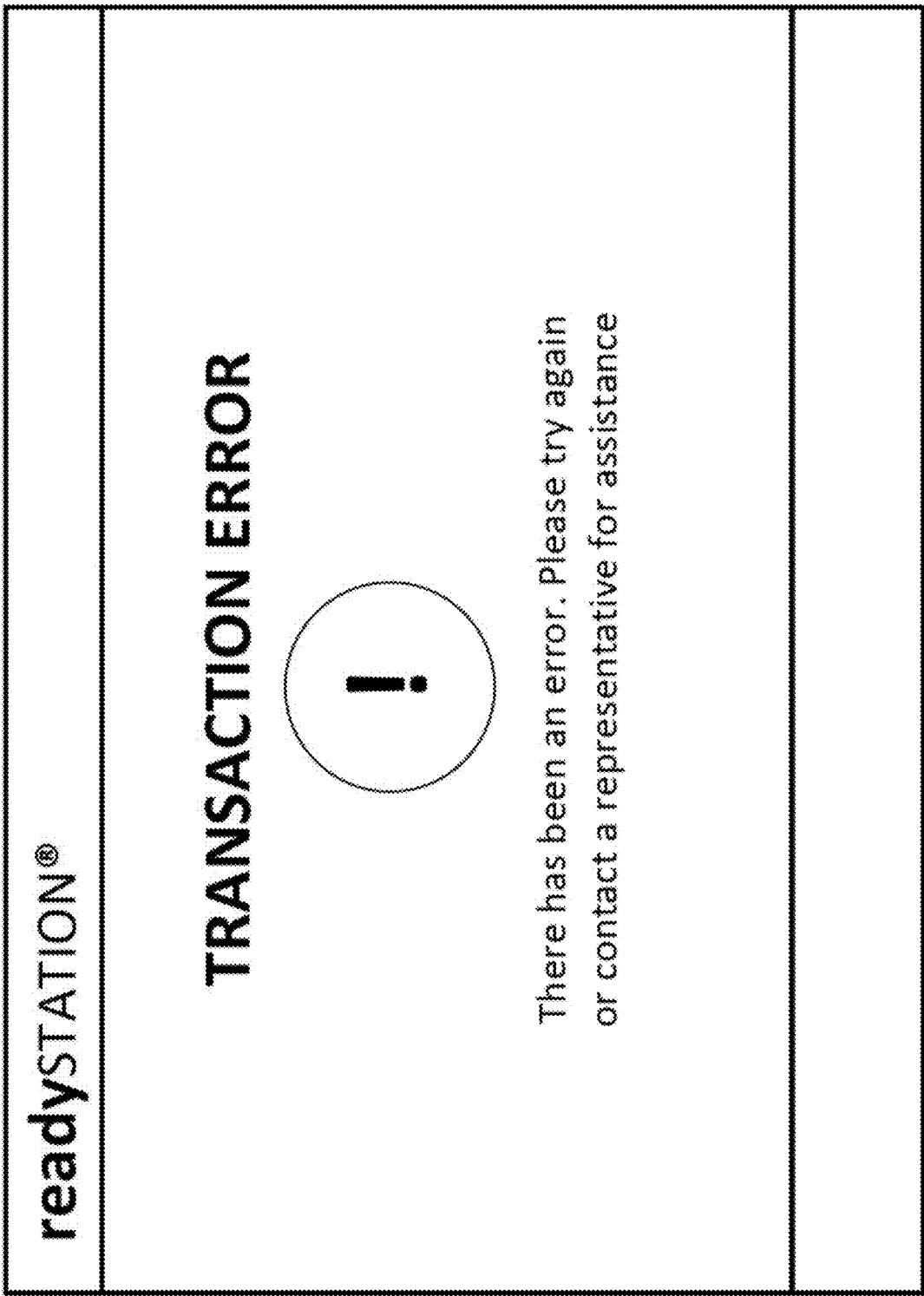
Figure 6B:
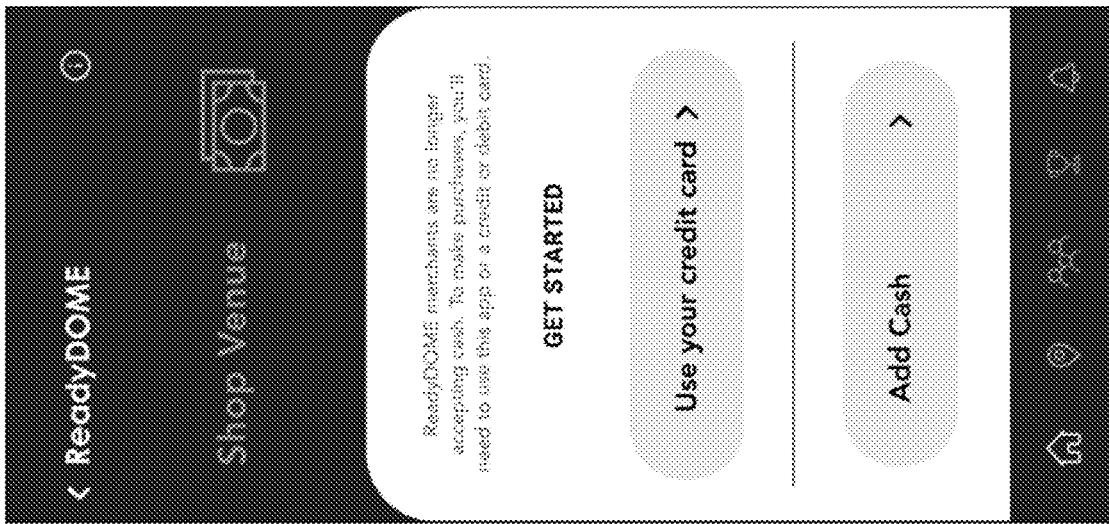
FIGS. 6a-6o are example illustrations of screen displays that may be used on a remote internet enabled device during the operational flow of FIGS. 3a and 3b.
Figure 6A:
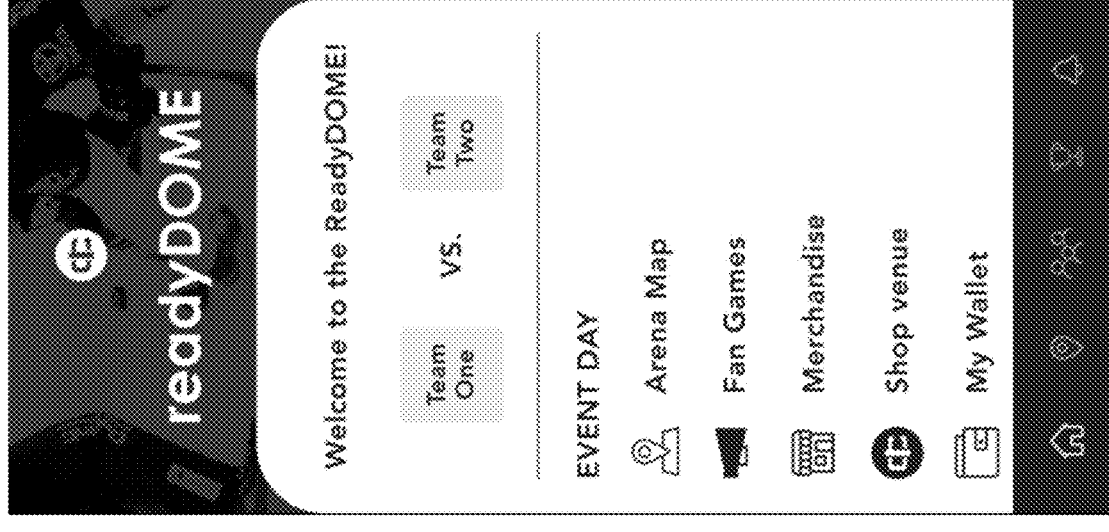
Figure 6D:
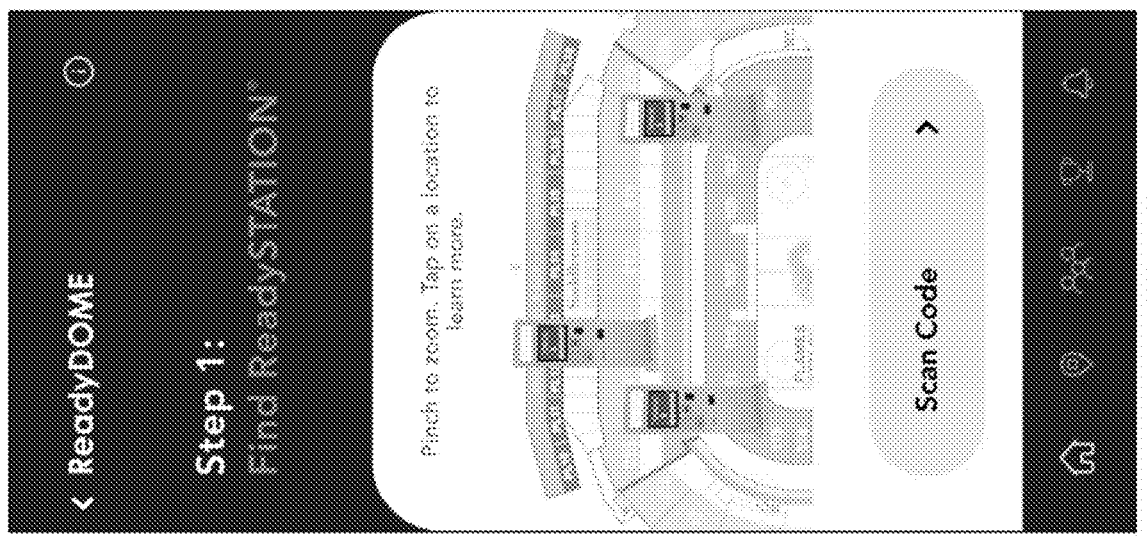
Figure 6C:

Turning now to FIGS. 3a and 3b, FIG. 4, FIGS. 5a-5h and FIGS. 6a-6o, an example operational flow, timing, and representative screen displays which may be used in connection with establishing and adding value to a virtual value-bearing card is provided in accordance with an embodiment of the present invention, together. User 201 first determines to initiate a virtual value-bearing card from an internet enabled device 171. As noted above, an application is loaded and is running on the internet enabled device 171. FIG. 6a includes a representative "Home" screen display which may be included on a display of the internet enabled device 171. At block 301, a user decides to initiate an obtain transaction and selects the add cash option (best as seen in FIG. 6b). The application then alerts the user to locate the nearest kiosk 110 (e.g., a self-service device) and to enter the displayed code and cash 202 into the kiosk 110 using FIG. 6c. In some embodiments, the application running on the internet enabled device 171 may provide directions to the nearest kiosk as illustrated in FIGS. 6d and 6e.

Figure 6F:
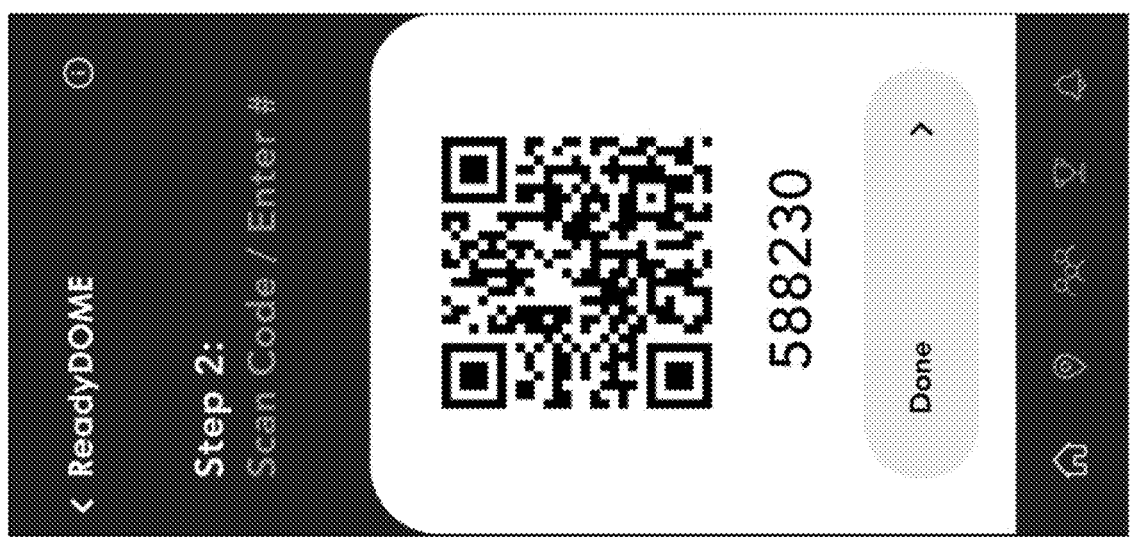
Figure 6E:
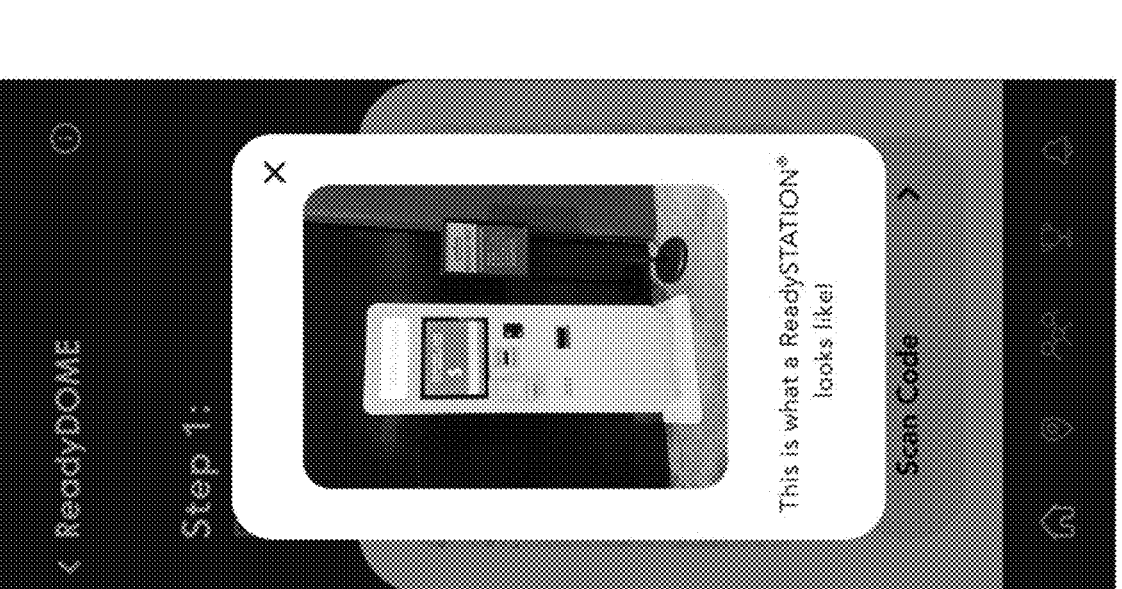

A representative code is next displayed on the internet enabled device as illustrated in FIG. 6f. At block 302, the code on the display (or the alphanumeric code) is scanned by the reader 117 of the kiosk 110 at block 302. The code reader 117 is initiated by the user selecting the scan code option displayed on the kiosk display 112. A representative example of a home screen which may appear on the kiosk 110 is illustrated in FIG. 5a and a representative example of an instruction to begin scanning the code is illustrated in FIG. 5c. Prior to moving to the scanning step, the kiosk 110 may also provide various messages to the user 201 regarding any limitations of the upcoming transaction. For example, a representative message is illustrated at FIG. 5b.

At block 303, the customer code that has been read or entered into the kiosk is confirmed with the application operator (e.g., with the operator back office). If a valid account message is received at block 304, the process proceeds to block 305. If the returning message from the application operator is that the account is not valid, the process returns to block 302. It is noted that in some instances the code may not scan properly. Accordingly, FIG. 5c also provides an illustration of an alternative numeric code entry. If the user 201 determines to use the alternative code, it is entered on the input device 111 of the kiosk 110. FIG. 5d illustrates a representative example of a screen display which may be used in connection with manual entry of the code.

At block 305, the customer 201 is invited to enter cash into the kiosk. FIG. 5e illustrates a representative screen which may be used by the kiosk 110 during this step. At block 306, the kiosk waits for an indication from the user 201 that no more cash 202 will be added for the transaction. FIG. 5e also illustrates a button which may be used to provide the indication (i.e., "I'M DONE" button). FIG. 5f is a representative screen display on the kiosk 110 providing the user 201 an indication of the total amount that has been inserted into the kiosk, for example via the bill acceptor 113. In addition, the user is invited to confirm that the adding cash step has been completed. In some embodiments, the user 201 may be provided an opportunity to return to the add cash step at block 305.

At block 307, it is determined whether the user 201 would like a physical value-bearing card, a virtual value-bearing card, or both. In addition, in some embodiments, it may occur that the kiosk 110 has run out of physical cards, the physical card dispenser 114 is inoperative and/or that the kiosk 110 is constructed to only issue virtual cards 210. In the case of a physical value-bearing card 203 being desired by the user 201, the process proceeds to block 308, where the next physical card in the hopper 105 is read. At block 309, the kiosk 110 communicates with the remote server 160 to provide the card details, the amount, and the customer account number (e.g., as associated with the scan or code entered from the application operator). The process then moves to block 312 to activate and load funds onto the physical card. Next at block 314, the system determines if the funds have been loaded successfully onto the physical card 203. In the event that an error has occurred, a receipt is printed by the kiosk printer 115 and a screen display is shown to the user 201 advising the user 201 of the error.

Returning to block 307, in the event that a physical card 203 is not available or not wanted by the user, the process proceeds to block 310 where the physical server 160 is contacted with the amount and the customer account provided by the application operator. Moving to block 311, the acquirer processor is called to generate the virtual card, activate and load the funds onto the card. The process then moves to block 314 where the system determines if the funds have been successfully loaded. As noted above, if an error has occurred, the process moves to block 324. However, if the funds have been successfully loaded, then the process moves to block 315 where the application operator is contacted with the card details, amount and customer account. At block 316, the application operator tokenizes the information and sends a push notification at block 317 to the user's internet enabled device 171 in order to add the virtual value-bearing card 210 to the application wallet.

The process next proceeds to block 318 where it is determined whether to issue a physical value-bearing card. If the answer is yes, the process proceeds to block 319 where the card dispenser 115 issues the card. FIG. 5g illustrates a screen providing the user with an indication that a physical card has been issued, the card is ready for use, and that the user should return to the application and press "My Wallet" or similar instructive messaging to review the balance. The user 201 removes the physical card 203 from the card dispenser 114 at block 320 and is invited to print a receipt at block 321.

Figures 6G, 6H:

Returning to block 318, if the answer is no, the process proceeds to block 323 where the virtual value-bearing card is issued. FIG. 6g illustrates a representative display which may be used to alert the user 201 on the application of a push message (e.g., a "notification") provided to the user 201 on the user's internet enabled device 171. The push message is initiated by the application provider. It will be appreciated that the kiosk 110 and its associated back office does not have any identifying information of the user and so could not directly provide such a message to the internet enabled device 171. In some embodiments, however, messages might be sent in an indirect manner to the user's internet enabled device 171 by contacting the application provider and requesting that the message be sent. The process proceeds to block 321. If a receipt is requested by the user 201 at the kiosk 110, it is printed by printer 115 at block 322. The process then proceeds from block 322 and block 321 when a receipt is not requested to block 325 where the transaction is completed.

Figure 6J:
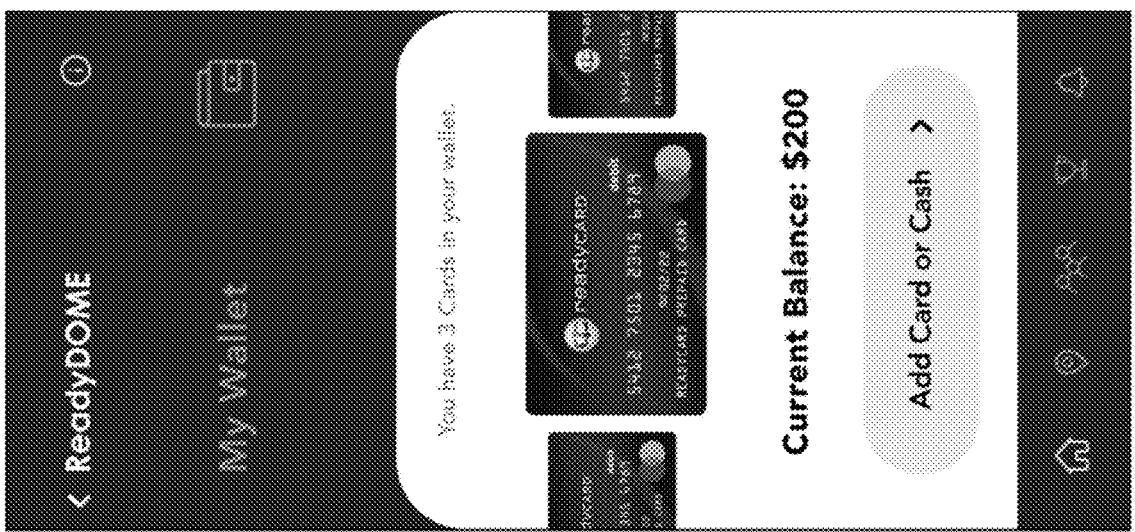
Figure 6I:
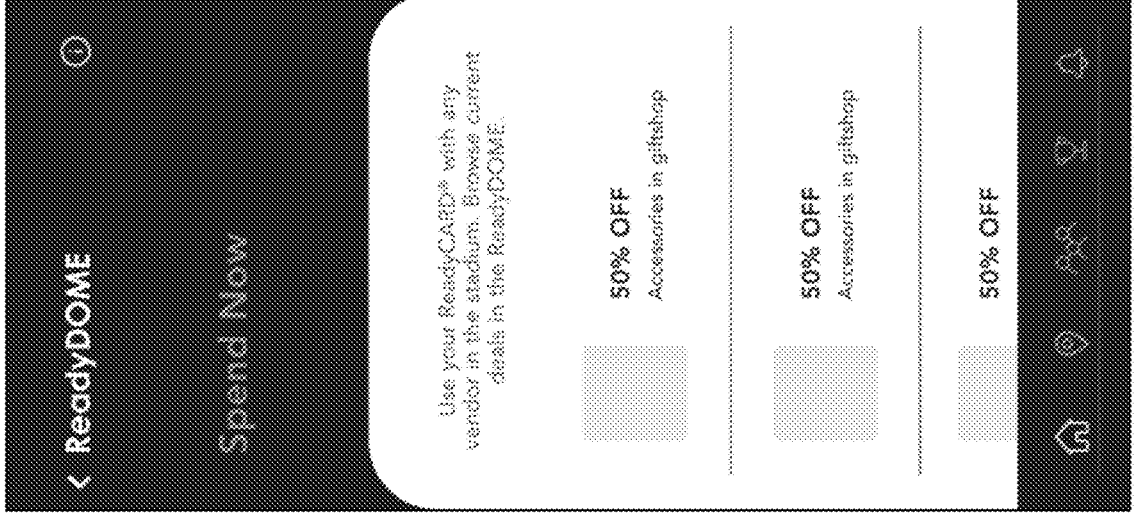
Figure 6N:
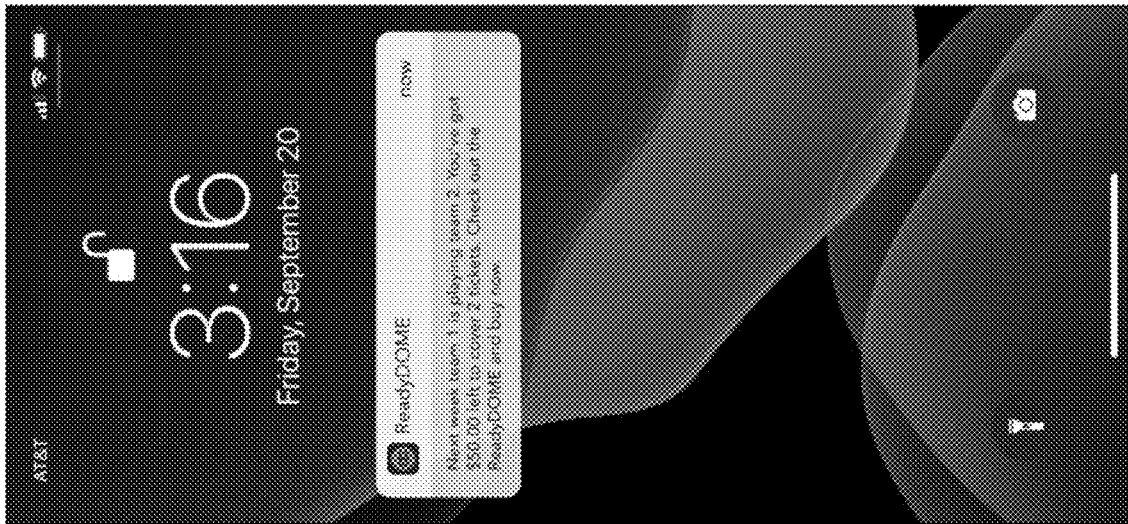
Figure 6M:
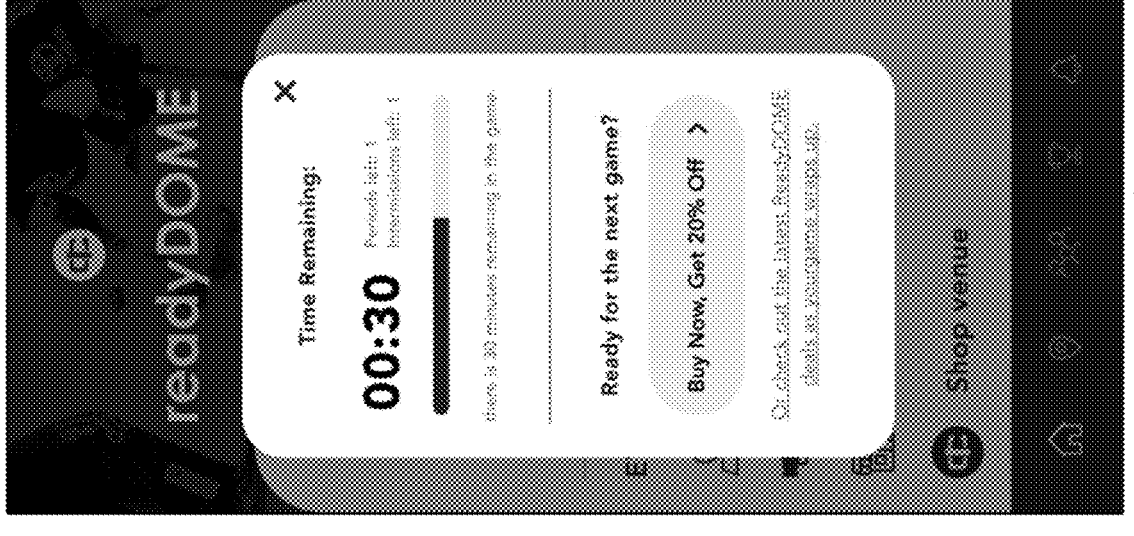
Figure 6Q:

FIG. 6h illustrates a representative message on the application which may be used to provide the amount loaded onto the virtual value-bearing card and additional details in connection with the virtual value-bearing card 210. With regard to additional details, FIG. 6i illustrates discounts and other opportunities with which the virtual card may be used. FIGS. 6j and 6k illustrate a representative manner in which the virtual value-bearing card is displayed when stored in the wallet of the application. FIG. 6l provides a representative screen which additional information may be provided to the user 201. In one example, limitations and information on how and when the virtual value-bearing card may be used. However, any other type of information may be provided on this or on a series of screen display pages. FIG. 6m illustrates a representative screen for the internet enabled device 171 which providing further additional information regarding the time remaining in a game occurring at a facility in which embodiments of the present invention may be employed. For the purposes of this example, a sporting event is used. However, other events such as trade shows, conferences, conventions, casinos, etc. might also be an event at which virtual prepaid cards might be desirable. FIG. 6*n* illustrates a representative notification for an internet enabled device 171 reminding a user 201 that a game is upcoming. Such a notification would allow a user 201 to optionally secure a value-bearing card 210 prior to the game by visiting a kiosk 110 that is in a location accessible to the user 201. In some embodiments, point of sale devices (e.g., in convenience stores and the like) may include the functionality of the kiosk 110. In such instances, a user can conduct the value-bearing card transaction at locations having such point of sale devices. The user's internet enabled device 171 may also provide maps to such locations. It will also be appreciated that if the value-bearing card is secured remotely, a physical card 203 would not be immediately issued. However, in some embodiments, the card might be secured when the user attends the arena or facility at a later time. For example, FIG. 6*o* illustrates a screen display for an internet enabled device 171 in which the cash is paid into the kiosk 110 at a later time.

Figure 4:
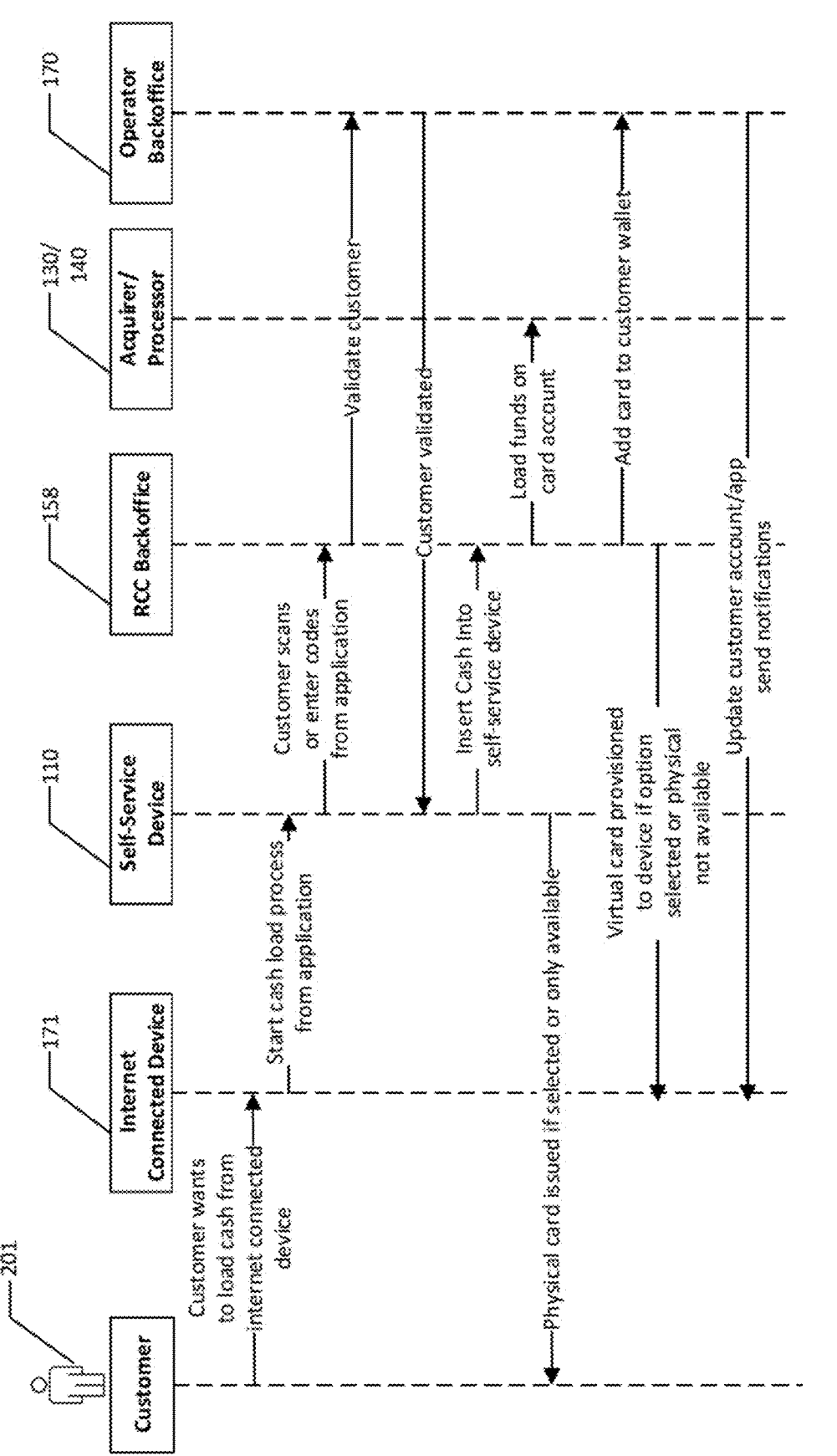
FIG. 4 illustrates an example timing sequence for establishing and adding value of the virtual value-bearing card in accordance with the operational flow of FIGS. 3a and 3b.

FIG. 4 illustrates the timing of the processes between the user 201, internet connected device 171, kiosk 110, remote server 160, acquirer/processor 130/140 and the application operator 170 interact during the above described process. It will be appreciated, however, that other timing and sequences may be used. It will also be appreciated that by using a code generated by the application operator, which is provided to the kiosk 110 to initiate the process, the kiosk 110 does not ever have identifying information on the user 201. Accordingly, there is a significant advantage in connection with the present system.

Alternative Embodiment

In an alternative embodiment, a self-service kiosk is disclosed that offloads cash acceptance in order to create a cashless environment in a retail environment, such as a mall, stadium or festival. Generally stated, the self-service kiosk can securely accept cash and dispense digital "cashless" equivalents for use by the customers. In one example, the kiosk can accept cash and convert the cash into a pre-paid credit or debit card. In another example, the kiosk can accept cash and load the cash into a digital virtual currency provider account. In a further example, the kiosk can accept cash and fund a mobile application account.

Several challenges exist when exchanging cash into a digital form. For example, both physical security and maintaining appropriate security in the digital environment is an issue. Another issue relates to error processing and validation of the converted funds. A further issue relates to scalable management of numerous forms of exchanged cash, while also maintaining proper compliance with appropriate regulatory agencies.

Another challenge when dealing with cash is the regulatory requirements that surround anti-money laundering laws and regulations. The system can verify a customer's identity to comply with Know Your Customer laws and appropriately track suspicious activity at a particular location, such as a kiosk or other location.

Figure 7:
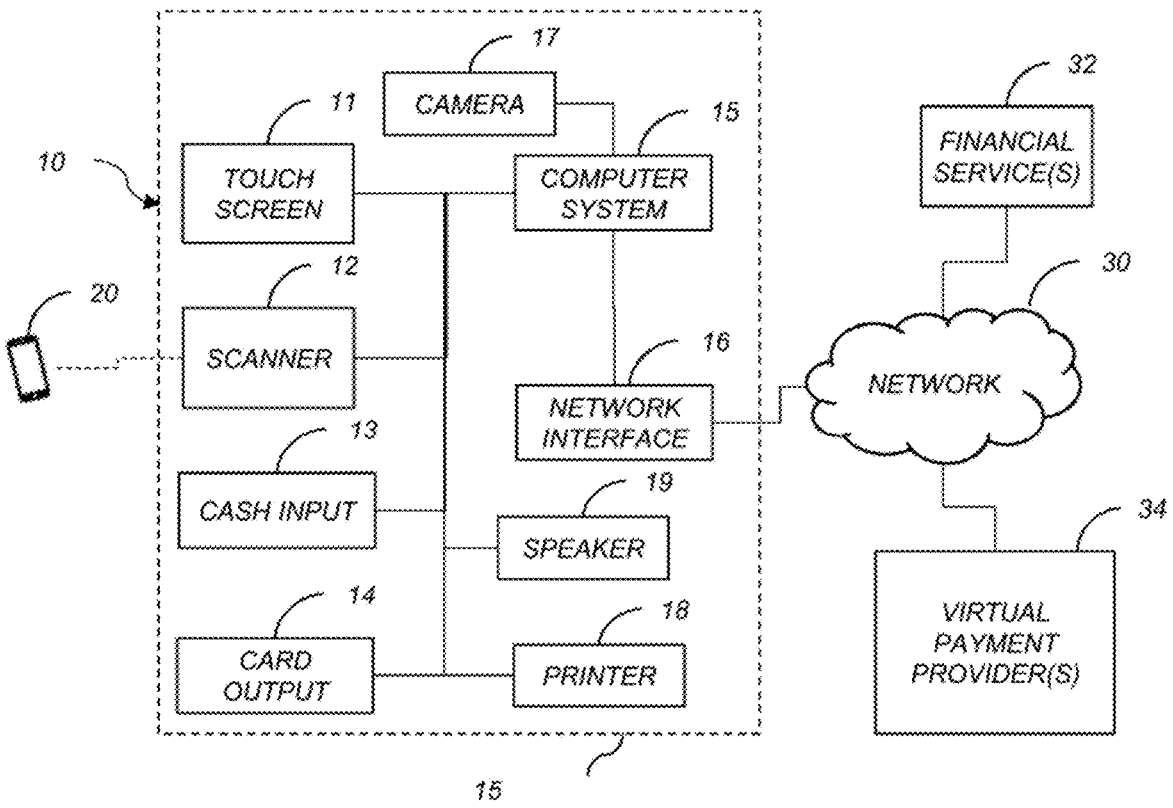
FIG. 7 is a block diagram of an alternative embodiment system for exchanging cash to digital form, in accordance with one or more aspects set forth herein.

FIG. 7 depicts a block diagram of a system 10 for exchanging cash to digital form. In one embodiment, the system 10 includes a human-machine interface such as a touch screen 11 along with a speaker 19 for allowing a user to interact with the system 10 by navigating and making selections. In addition, a scanner 12 for scanning a mobile device 20 or any other physical item such as a credit card is provided. The system 10 also includes a cash input 13 for receiving, validating, accepting and identifying cash from the user. The system 10 includes a card dispenser output 14 for storing, activating and outputting a card to the user. The system 10 is controlled by an internal computer system 15 that includes a processor, memory, storage, and other affiliated circuitry. The system 10 includes a wired or wireless network interface 16 which can be used to communicate via a network 30 with financial services 32 and/or virtual payment providers 34. Note that a touch screen and computer are generally used as a combined unit. While they may be separate, an all-in-one tablet-type approach can be used for simplicity.

The system 10 itself may be deployed as a kiosk with a metal outer enclosure that protects the physical security of the hardware of the system 10. A separate "vault" inside the system 10 may be used to further isolate the cash and cash components from other components so that access is restricted. High security keyless locking mechanisms may be used to further secure the cash equipment. In addition, a camera 17 may be included to take photos of the customers in order to provide security validation. Further, a printer 18 can be included to provide a receipt to the customer. The camera will take photos of the individuals purchasing to facilitate detection of fraudulent purchases.

In one example, the card dispenser output 14 will store cards and read a number from a plastic card that can be used to activate the card. The card dispenser output 14 can read cards that are encoded using a QR code, a magnetic stripe, a bar code, an IC (integrated circuit) or other number encoding technologies. In case of error or a delay in retrieving cards from the output 14, the physical card may voided and subsequently retracted into a separate error bin.

Figure 8:
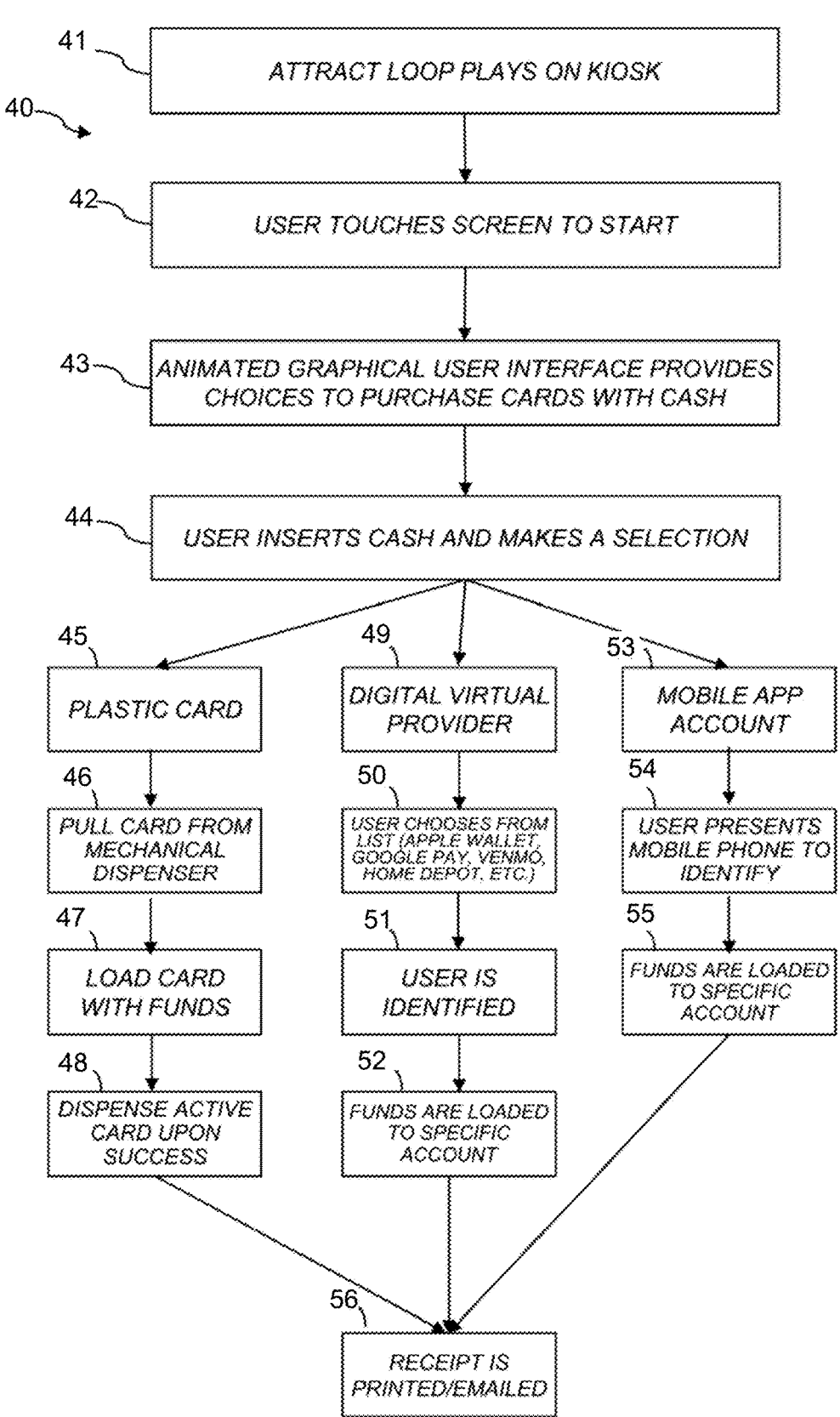
FIG. 8 is a flowchart of a method of exchanging cash to digital form, in accordance the alternative embodiment of FIG. 7.

FIG. 8 is a flowchart of a method 40 of exchanging cash to digital form. In one embodiment, the method 40 at block 41 runs an attraction loop on the screen of the kiosk to welcome customers to the kiosk. For example, the customer is presented with an attract loop screen saver that provides basic information regarding the operation of the kiosk. Next, the method 40 at block 42 accepts customer input via a touch screen. Subsequent to a selection by the customer, the method 40 at block 43 displays an animated user interface on the kiosk screen offering a number of choices of how to exchange cash for digital forms. Next, the method 40 at block 44 accepts the customer's input and accepts cash that is fed into the kiosk by the customer. For example, the cash acceptor input identifies each bill inserted and displays the running total on the touch screen. In one example, the cash acceptor has built-in counterfeit detection. In another example, the system can include cash recyclers and/or coin acceptors. Cash recyclers can use cash that was inputted for change.

Depending on the selection made by the customer at block 44, the method 40 continues with a different procedure. If the customer selected to receive a plastic card, the method 40 continues at block 45 to allow the customer to provide specific selections related to a plastic card. Next, the method 40 at block 46 prepares a plastic card from a mechanical dispenser located within the kiosk. For example, a pre-printed, un-activated anonymous prepaid card is pulled from a stack of cards, the number on the magnetic stripe is read by the card dispenser, and the card number is sent to the card activation processor to load the amount of funds onto the card. If there is an error during the process, the machine will reject the prepaid card back into the kiosk, present an error message to the customer, and print a receipt indicating there was an error. Then, the method 40 at block 47 loads the card with funds corresponding to the cash input into the kiosk by the customer at step 44. Following the card being loaded and validated, the method 40 at block 48 dispenses the activated plastic card to the consumer. For example, the card is ejected from the machine, and the customer has several seconds in which to retrieve the card. In another example, fallback to a digital card can be initiated if the process of dispensing a physical plastic card fails for some reason. For example, if all of the physical plastic cards are turned upside down, the dispense action will fail and a receipt showing a digital equivalent will be printed and/or the customer will be prompted to use their mobile phone to create an account and load funds there.

If the customer selected to a digital virtual provider at block 44, the method 40 continues at block 49 to allow the customer to provide specific selections related to a digital virtual provider. Next, the method 40 at block 50 presents a list of providers to the customer. For example, the digital virtual provider could be a generic wallet type provider such as Apple Wallet, Google Pay, Venmo, etc. On the other hand, the digital virtual provider could be a specific retailer such as Home Depot or a sports team. After the customer has chosen a provider, the method 40 at block 51 identifies a user name or account within that provider and transfers the cash funds to that account at block 52.

In another example, a user may use the scanner or peripheral device to verify their identity. In such a case, a configuration setup process that is part of the initial configuration will identify the different virtual account providers and how they are associated. For example, those providers may not be direct—i.e., they may likely go through a 3rd party that provides all of or some of the affiliations. For example, the system can use FIS as a processor to fund the account who has the relationship with Venmo, Apple, Google, etc. and can use a different processor to be able to provide the Home Depot card. All the proper connections can be made on the backend as part of the initial setup process.

If the customer selected a mobile application account, the method 40 continues at block 53 to allow the customer to provide specific selection related to the mobile application account. Next, the method 40 at block 54 enables an interaction between the customer's mobile phone or device and the kiosk in order to affiliate with and contact the mobile application account. Subsequently, the method 40 at block 55 loads funds to the specific account.

In one embodiment, the money collected at the kiosk is tied to the account information on the mobile app. For example, a user can go to the kiosk, open the mobile app and log in; the kiosk would prompt to select the "identify" function in the mobile app and use the scanner to read the QR code to identify the user. Once identified, any funds inserted into the cash acceptor will be attached to the user's account which can be further used to convert into any other form of currency. For example, a user can insert $50 into the kiosk and then choose to spend $10 at the store that the user is in, use Venmo to send $20 to someone to spend at the mall, and then keep $20 in the user's account to be used at a later date.

After the method 40 has completed the conversion of the cash to a digital form, the method 40 at block 56 confirms the transaction by emailing and/or printing a receipt.

Advantageously, the system 10 and method 40 described herein allows customers to purchase prepaid cards using cash currency. This technique solves the problem of customers looking to exchange their cash for a usable card product. The system 10 and method 40 advantageously leverage the ubiquitous nature of smart phones to achieve, via the present technique, a simpler, less expensive approach for converting cash into an alternative currency product. Another advantage is the elimination of the need for a physical plastic card and replaces it with a digital virtual card product. A self-service kiosk distribution model allows customers to exchange their cash to a digital payment provider on their mobile device without human interaction, reducing security risks.

Embodiments of the present disclosure may include a system, a method, and/or a computer program product. The computer program product may include a computer readable storage medium (or media) having computer readable program instructions thereon for causing a processor to carry out aspects of set forth herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the certain embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects set forth herein.

Embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A system for issuing a virtual value-bearing card, the system comprising:

a kiosk, wherein the kiosk is configured to:

a) receive input from a user, the input including a code initiated by an application running on a remote internet enabled device, wherein the code enables an initiation of a transaction between the user and the kiosk, whereby the code does not identify the user;

b) receive assets and determine a value of the received assets;

c) review the code and the value of the received assets and generate a message requesting that a virtual value-bearing card be activated for an account associated with the code; and d) send the message to a prepaid card acquirer and card processor in order to generate and activate the virtual value-bearing card during the transaction, load the received assets on the virtual value-bearing card during the transaction, generate a token during the transaction connecting the virtual value-bearing card and a physical value-bearing card with the account, and populate, during the transaction, the virtual value-bearing card onto the application running on the remote internet enabled device, wherein the virtual value-bearing card added to the remote device includes only information that does not identify the user, the information including an account number;

e) wherein the virtual value-bearing card is associated with a payment processing network and an issuing bank;

g) wherein the kiosk is configured to load, during the transaction, the received assets on the physical value-bearing card and to dispense, during the transaction, the physical value-bearing card, wherein the received assets are available on the physical value-bearing card and the virtual value-bearing card;

h) wherein each of the physical value-bearing card and the virtual value-bearing card are available during the transaction with the kiosk.

2. The system of claim 1, wherein the kiosk is configured to scan the code initiated by the remote internet enabled device prior to receiving assets.

3. The system of claim 1, wherein the received assets are simultaneously available on the virtual value-bearing card and the physical value-bearing card.

4. The system of claim 1, wherein the kiosk comprises a display screen configured to present selectable options to the user.

5. The system of claim 4, wherein the display screen includes a touch screen, which forms at least part of the input device.

6. The system of claim 1, wherein the virtual value-bearing card is a prepaid card.

7. The system of claim 1, wherein the account number is associated with an account at the issuing bank.

8. The system of claim 6, wherein the message includes a request to store the prepaid card in a virtual wallet in the application on the remote internet enabled device.

9. The system of claim 1, wherein the assets include at least one of the group consisting of currency, checks, and credit, debit and gift cards.

10. The system of claim 1, wherein the kiosk is configured to, in response to a user request, dispense the physical card connected to a same account as the virtual card.

11. A system for exchanging cash to one or more digital forms, the system comprising:

a touch screen for accepting input from a customer;

a scanner for communicating with a mobile device of the customer;

a network interface for communicating with at least one financial service or virtual payment provider; and wherein the system is configured to exchange cash input by the customer to a digital form and load the digital form of the cash onto the mobile device of the customer;

wherein the system is configured to, using the scanner, scan or enter a code generated by an application running on the mobile device of the customer, the code being associated with an account, wherein the code enables an initiation of a transaction between a kiosk and the customer;

wherein the system is configured to, using the network interface, activate a virtual value-bearing card for the account during the transaction, generate a token during the transaction connecting the virtual value-bearing card and a physical value-bearing card with the account, and load the cash input from the customer on the virtual value-bearing card during the transaction;

wherein loading the digital form of the cash onto the mobile device of the customer comprises providing the virtual value-bearing card to the application;

wherein the virtual value-bearing card is associated with a payment processing network and an issuing bank;

wherein the touch screen, the scanner, and the network interface are housed within the kiosk;

wherein the kiosk is configured to load, during the transaction, the received assets on the physical value-bearing card and to dispense, during the transaction, the physical value-bearing card, wherein the received assets are available on the physical value-bearing card and the virtual value-bearing card;

wherein each of the physical value-bearing card and the virtual value-bearing card are available during the transaction with the kiosk.

12. The system of claim 11, wherein the system is further configured to exchange another cash input from another customer to another digital form and load the other digital form onto a card and dispense the card to the other customer.

* * * * *